US012578586B2

(12) United States Patent
Phare et al.

(10) Patent No.: US 12,578,586 B2
(45) Date of Patent: Mar. 17, 2026

(54) ON-CHIP MIRROR BEAMFORMING

(71) Applicant: Voyant Photonics, Inc., New York, NY (US)

(72) Inventors: Christopher T. Phare, New York, NY (US); Steven A. Miller, New York, NY (US)

(73) Assignee: Voyant Photonics, Inc.

(*) Notice: Subject to any disclaimer, the term of this patent is extended or adjusted under 35 U.S.C. 154(b) by 1147 days.

(21) Appl. No.: 17/599,949

(22) PCT Filed: Mar. 28, 2020

(86) PCT No.: PCT/US2020/025565
§ 371 (c)(1),
(2) Date: Sep. 29, 2021

(87) PCT Pub. No.: WO2020/205673
PCT Pub. Date: Oct. 8, 2020

(65) Prior Publication Data
US 2022/0155608 A1     May 19, 2022

(51) Int. Cl.
| *G02B 27/30* | (2006.01) |
| *G01S 7/481* | (2006.01) |
| *G02B 5/09* | (2006.01) |
| *G02B 5/10* | (2006.01) |
| *G02F 1/01* | (2006.01) |
| *G02B 27/10* | (2006.01) |

(52) U.S. Cl.
CPC ........... *G02B 27/30* (2013.01); *G01S 7/4815* (2013.01); *G02B 5/09* (2013.01); *G02B 5/10*
(2013.01); *G02F 1/011* (2013.01); *G02B 27/106* (2013.01); *G02F 2203/50* (2013.01)

(58) Field of Classification Search
CPC ........ G02B 27/30; G02B 27/106; G02B 5/09; G02B 5/10; G02S 7/4815; G02F 1/011; G02F 2203/50
See application file for complete search history.

(56) References Cited

U.S. PATENT DOCUMENTS

| 3,852,765 | A | * | 12/1974 | Bresler | .................. | H01Q 19/19 |
| | | | | | | 343/837 |
| 4,905,014 | A | * | 2/1990 | Gonzalez | ........... | H01Q 15/0013 |
| | | | | | | 343/754 |
| 4,935,930 | A | | 6/1990 | Handa | | |

(Continued)

OTHER PUBLICATIONS

M. Cooley, "Phased Array Fed Reflector (PAFR) antenna architectures for space-based sensors," 2015 IEEE Aerospace Conference, Big Sky, MT, USA, 2015, pp. 1-11, doi: 10.1109/AERO.2015.7118963. (Year: 2015).*

(Continued)

*Primary Examiner* — Peter Radkowski
(74) *Attorney, Agent, or Firm* — Stratford Group Ltd.

(57) ABSTRACT

Disclosed herein are systems and architecture for sending and receiving collimated beams directly from a photonic chip via on-chip mirror beamforming device to reduce manufacturing difficulties and optical aberrations. More specifically, an elliptical or parabolic mirror may be used in the photonic chip to collimate beams emitted from a waveguide port and to further enable techniques, such as wavefront error correction and beam steering, without moving parts.

21 Claims, 20 Drawing Sheets

(56) References Cited

U.S. PATENT DOCUMENTS

| | | | | |
|---|---|---|---|---|
| 5,386,431 A * | 1/1995 | Tulip | H01S 3/0315 | |
| | | | 359/348 | |
| 5,892,485 A * | 4/1999 | Glabe | H01Q 15/0013 | |
| | | | 343/756 | |
| 5,937,113 A * | 8/1999 | He | G01J 3/02 | |
| | | | 385/11 | |
| 6,169,838 B1 * | 1/2001 | He | G02B 6/12007 | |
| | | | 385/10 | |
| 6,298,178 B1 | 10/2001 | Day et al. | | |
| 6,424,760 B1 * | 7/2002 | Katayama | G02B 6/12009 | |
| | | | 385/24 | |
| 6,426,727 B2 * | 7/2002 | Gilbert | H01Q 19/19 | |
| | | | 343/912 | |
| 6,466,707 B1 * | 10/2002 | Dawes | G02B 6/10 | |
| | | | 385/14 | |
| 6,473,546 B2 * | 10/2002 | Katayama | G02B 6/12011 | |
| | | | 398/43 | |
| 6,571,034 B2 * | 5/2003 | Bhagavatula | G02B 6/12021 | |
| | | | 385/11 | |
| 6,574,397 B2 * | 6/2003 | Katayama | G02B 6/12009 | |
| | | | 385/37 | |
| 6,633,703 B2 * | 10/2003 | Katayama | G02B 6/12016 | |
| | | | 385/37 | |
| 6,665,466 B2 * | 12/2003 | Katayama | G02B 6/12016 | |
| | | | 385/24 | |
| 6,785,442 B2 * | 8/2004 | Nicolas | H04Q 11/0005 | |
| | | | 385/37 | |
| 6,823,103 B2 * | 11/2004 | Lam | G02B 6/12016 | |
| | | | 385/24 | |
| 6,985,657 B2 * | 1/2006 | Nakagawa | G02B 6/12011 | |
| | | | 398/118 | |
| 7,127,139 B2 | 10/2006 | Onaka et al. | | |
| 7,154,451 B1 * | 12/2006 | Sievenpiper | H01Q 1/248 | |
| | | | 343/753 | |
| 7,352,940 B2 | 4/2008 | Charters et al. | | |
| 7,376,308 B2 * | 5/2008 | Cheben | G02B 6/425 | |
| | | | 385/47 | |
| 7,397,986 B2 * | 7/2008 | Bulthuis | G02B 6/12028 | |
| | | | 385/37 | |
| 7,447,393 B2 * | 11/2008 | Yan | G02B 6/12026 | |
| | | | 385/129 | |
| 7,474,824 B2 | 1/2009 | Bidnyk et al. | | |
| 7,576,701 B2 * | 8/2009 | McGrath | H01Q 3/20 | |
| | | | 343/757 | |
| 7,689,072 B2 * | 3/2010 | Bulthuis | G02B 6/12014 | |
| | | | 385/37 | |
| 7,692,601 B2 * | 4/2010 | Bisiules | H01Q 21/24 | |
| | | | 343/803 | |
| 7,720,328 B2 * | 5/2010 | Yan | G02B 6/12011 | |
| | | | 385/14 | |
| 8,217,847 B2 * | 7/2012 | Sotelo | H01Q 15/14 | |
| | | | 343/912 | |
| 8,406,580 B2 | 3/2013 | Takada et al. | | |
| 8,665,040 B1 * | 3/2014 | Chappell | H01P 1/2053 | |
| | | | 333/205 | |
| 8,873,910 B2 * | 10/2014 | Bulthuis | G02B 6/12028 | |
| | | | 385/27 | |
| 9,256,028 B2 | 2/2016 | Li | | |
| 9,502,780 B2 * | 11/2016 | Chau | H01Q 21/24 | |
| 10,263,342 B2 * | 4/2019 | Hand | H01Q 1/38 | |
| 10,338,220 B1 * | 7/2019 | Raring | G01S 17/86 | |
| 10,345,446 B2 * | 7/2019 | Raring | H01S 5/02375 | |
| 10,649,086 B2 * | 5/2020 | Raring | H01S 5/34333 | |
| 10,777,895 B2 * | 9/2020 | Paulotto | H01Q 9/40 | |
| 10,897,075 B2 * | 1/2021 | Cooley | H01Q 19/18 | |
| 10,944,164 B2 * | 3/2021 | Cooley | H01Q 1/38 | |
| 11,199,628 B2 * | 12/2021 | Raring | H01S 5/0085 | |
| 11,231,499 B2 * | 1/2022 | Raring | F21V 29/70 | |
| 11,249,189 B2 * | 2/2022 | Raring | H01S 5/02212 | |
| 11,287,527 B2 * | 3/2022 | Raring | G01S 17/89 | |
| 11,385,516 B2 * | 7/2022 | Didomenico | G02F 1/167 | |
| 11,575,214 B2 * | 2/2023 | Hand | H01Q 3/46 | |
| 11,841,429 B2 * | 12/2023 | Raring | F21K 9/64 | |
| 11,867,813 B2 * | 1/2024 | Raring | G01S 7/487 | |
| 2001/0050650 A1 * | 12/2001 | Gilbert | H01Q 19/19 | |
| | | | 343/797 | |
| 2002/0012496 A1 * | 1/2002 | Katayama | G02B 6/12011 | |
| | | | 385/24 | |
| 2002/0044731 A1 * | 4/2002 | Katayama | G02B 6/12016 | |
| | | | 385/24 | |
| 2002/0057865 A1 * | 5/2002 | Katayama | G02B 6/12016 | |
| | | | 385/24 | |
| 2002/0076145 A1 * | 6/2002 | Lam | G02B 6/12016 | |
| | | | 385/24 | |
| 2002/0085800 A1 * | 7/2002 | Katayama | G02B 6/12009 | |
| | | | 385/24 | |
| 2002/0089721 A1 * | 7/2002 | Nicolas | H04Q 11/0005 | |
| | | | 385/24 | |
| 2002/0118912 A1 * | 8/2002 | Katayama | G02B 6/12009 | |
| | | | 385/24 | |
| 2003/0002788 A1 * | 1/2003 | Bhagavatula | G02B 6/12021 | |
| | | | 385/27 | |
| 2003/0032285 A1 * | 2/2003 | Beguin | G02B 6/12011 | |
| | | | 438/689 | |
| 2005/0141808 A1 * | 6/2005 | Cheben | G02B 6/122 | |
| | | | 385/37 | |
| 2005/0141813 A1 * | 6/2005 | Nakagawa | G02B 6/12011 | |
| | | | 385/37 | |
| 2005/0185885 A1 | 8/2005 | Onaka et al. | | |
| 2006/0198579 A1 * | 9/2006 | Bulthuis | G02B 6/12016 | |
| | | | 385/37 | |
| 2006/0279734 A1 * | 12/2006 | Yan | G02B 6/12011 | |
| | | | 356/329 | |
| 2007/0230871 A1 | 10/2007 | Bidnyk et al. | | |
| 2008/0111757 A1 * | 5/2008 | Bisiules | H01Q 5/42 | |
| | | | 343/803 | |
| 2008/0226232 A1 * | 9/2008 | Bulthuis | G02B 6/12014 | |
| | | | 385/37 | |
| 2008/0238790 A1 * | 10/2008 | McGrath | H01Q 3/14 | |
| | | | 343/754 | |
| 2008/0247722 A1 | 10/2008 | Van Gorkom et al. | | |
| 2009/0079645 A1 * | 3/2009 | Sotelo | H01Q 15/0046 | |
| | | | 343/912 | |
| 2009/0087138 A1 * | 4/2009 | Yan | G02B 6/12026 | |
| | | | 385/14 | |
| 2011/0142396 A1 * | 6/2011 | Okamoto | G02B 6/12011 | |
| | | | 264/1.24 | |
| 2011/0229080 A1 * | 9/2011 | Bulthuis | G02B 6/12011 | |
| | | | 427/163.2 | |
| 2013/0294724 A1 | 11/2013 | Li | | |
| 2015/0102973 A1 * | 4/2015 | Hand | H01Q 21/26 | |
| | | | 343/837 | |
| 2015/0354938 A1 | 12/2015 | Mower et al. | | |
| 2016/0211585 A1 * | 7/2016 | Chau | H01Q 21/062 | |
| 2019/0020114 A1 * | 1/2019 | Paulotto | H01Q 9/40 | |
| 2019/0165485 A1 * | 5/2019 | Hand | H01Q 3/46 | |
| 2019/0179015 A1 * | 6/2019 | Raring | F21K 9/64 | |
| 2019/0179016 A1 * | 6/2019 | Raring | H01S 5/4087 | |
| 2019/0187284 A1 * | 6/2019 | Raring | G01S 7/4817 | |
| 2019/0353975 A1 * | 11/2019 | Didomenico | G02B 3/14 | |
| 2020/0064476 A1 * | 2/2020 | Raring | H01S 5/02325 | |
| 2020/0174123 A1 * | 6/2020 | Raring | F21K 9/64 | |
| 2020/0174124 A1 * | 6/2020 | Raring | H01S 5/02325 | |
| 2020/0176858 A1 * | 6/2020 | Cooley | H01Q 15/145 | |
| 2020/0295446 A1 * | 9/2020 | Cooley | H01Q 21/065 | |
| 2021/0278535 A1 * | 9/2021 | Raring | H01S 5/02251 | |
| 2022/0214455 A1 * | 7/2022 | Raring | H01S 5/0085 | |
| 2022/0252726 A1 * | 8/2022 | Raring | G01S 7/4817 | |

OTHER PUBLICATIONS

International Search Report and Written Opinion for corresponding PCT application No. PCT/US2020/025565, Sep. 1, 2020.

\* cited by examiner

(Homodyne)

801

802 or 912

Circulator
934

940
(Local Oscillator Tap)

812

800, 900, 950, 980

ON-CHIP MIRROR BEAMFORMING

TECHNICAL FIELD

The present disclosure relates to systems and architecture for sending and receiving collimated beams of light directly from a photonic chip, and in particular to applications in photonics, such as for LIDAR, spectroscopy, and other remote sensing.

BACKGROUND

There are many applications in photonics which require sending and receiving wide, e.g. over a millimeter in diameter, low-divergence, collimated beams using a photonic integrated circuit (PIC) chip. The typical method for creating a millimeter-scale diameter collimated beam involves using an external lens i.e. off chip. A diverging beam is emitted from the PIC chip, e.g. by using a waveguide brought to the chip edge, using an inverse taper, or using a small grating. The diverging beam then passes through the external lens, which is manufactured to specific parameters and is positioned/aligned to collimate the beam. However, the use of external lenses is problematic because the lenses are: i) expensive, ii) must be very precisely aligned at great assembly cost, iii) misaligned by vibration or motion, and iv) required to function at high numerical apertures.

Thus, monolithic, on-chip designs which do not require external optics are preferable for emitting collimated beams. Designs have been proposed for which light is coupled from a waveguide into a dielectric slab, allowed to diverge while propagating, and then collimated by a single in-plane lens element. However, these designs are very difficult to manufacture and fabricate due to the tiny tolerances involved. More specifically, these designs vary the thickness of the slab or add overlaying layers of material having different refractive indices to vary the effective refractive index, thereby forming the optical elements by defining regions of this varied thickness slab or overlay material. The focal length of the lens, and thus the defocus aberration of the system, is very sensitive to the effective refractive index of both the lens and the slab regions. The tolerances on the effective index means that the thicknesses of these layers and etch depths must be controlled to impractical nanometer levels. Additionally, single-element lenses like this suffer from optical aberrations, including chromatic aberration and higher-order aberrations, e.g. spherical, astigmatism, coma, etc., that are difficult to correct even with complicated aspheric or aplanatic lenses.

An object of the present invention is to overcome the shortcomings of the prior art by providing a photonic chips with monolithic, on-chip designs for sending and receiving collimated beams that are easy to manufacture without any optical aberrations.

SUMMARY OF THE INVENTION

Accordingly, the present invention relates to a beam forming device comprising:

a first input port for launching a first output beam of light;

a slab waveguide for confining the first beam of light in a first dimension, while enabling the first output beam of light to diverge in a second perpendicular dimension; and a reflector coupled to the slab waveguide for redirecting and substantially collimating the first output beam of light for output.

The reflector may comprise an elliptical reflector, which defines a segment of an ellipse comprising a first focus and a second focus; wherein the first focus is proximate the input port; and wherein the second focus is located external to the beam forming device.

Ideally, the second focus is far enough away such that the first output beam of light appears substantially collimated at output.

The reflector may comprise a spherical or arbitrary aspheric shape.

BRIEF DESCRIPTION OF THE DRAWINGS

The invention will be described in greater detail with reference to the accompanying drawings which represent preferred embodiments thereof, wherein:

FIG. 9D is a top view of a photonic chip and waveguide components for LIDAR sensing, in accordance with embodiments of the present disclosure.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

The embodiments of photonic chips disclosed herein seek to address these issues by using a mirror-based design to enable on-chip collimated beamforming. Notably, the focal length and optical aberrations of a curved mirror, e.g. an elliptical or parabolic mirror, do not depend on the refractive index surrounding the mirror, completely eliminating that source of defocus and aberrations. Additionally, multiple elements may be used—either all in-plane mirrors, all in-plane lenses, or some combination of in-plane mirrors and in-plane lenses, i.e. a catadioptric design, to improve imaging performance and lower higher-order aberrations. The design of these planar optical elements may be carried out using ray tracing and standard optical design principles for multi-element systems, using the effective index of the layer stack, e.g. slab thickness with any overlay material, as the index of the optical element.

Accordingly, embodiments of photonic chips are disclosed herein with varying designs that utilize mirror-based beamforming in order to send and receive wide, e.g. a beam having a width ranging from fifty microns to one or two centimeters, low-divergence, collimated beams directly from the photonic chip. The embodiments and additional considerations in implementing them are disclosed below.

Figure 1:
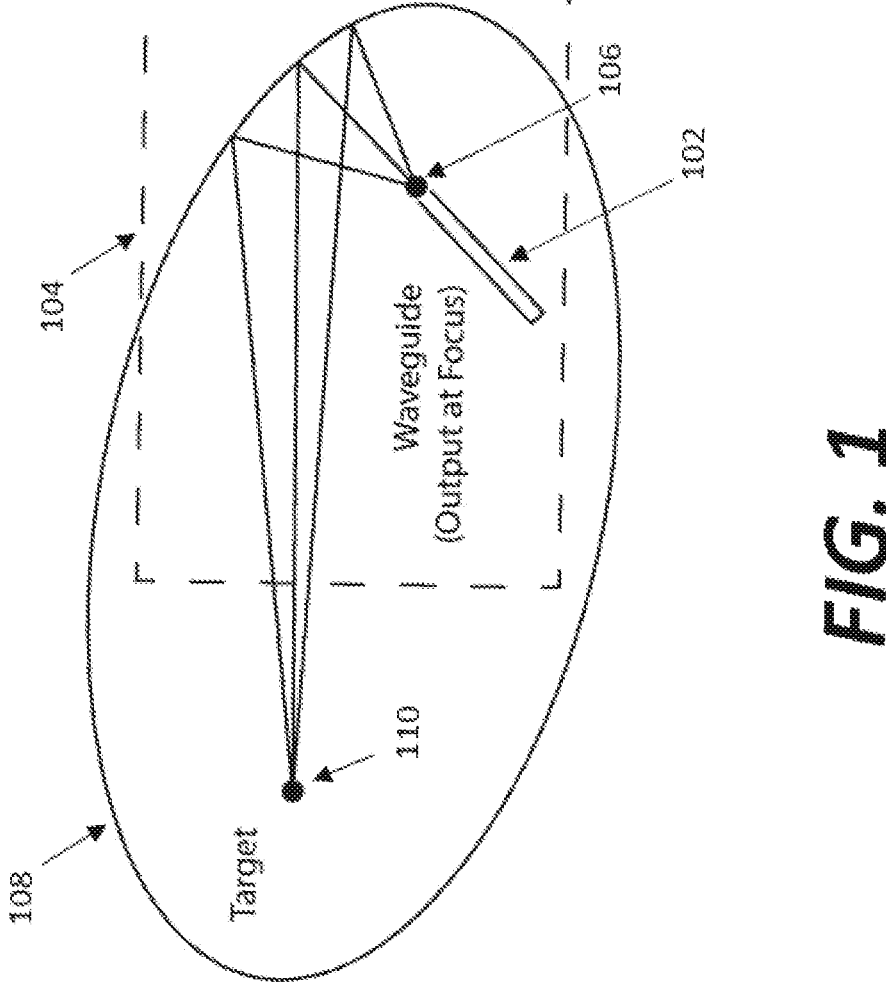
FIG. 1 is a diagram illustrating the underlying fundamental principle used in a mirror-based beamforming device, in accordance with embodiments of the present disclosure.

FIG. 1 illustrates the reflective property of an elliptical reflector 108. The elliptical reflector 108 has two foci 106 and 110, and when a ray of light leaves one of the foci, e.g. focus 106, and reflects off a point on the elliptical reflector 108, the ray of light will reflect off that point of the elliptical reflector 108 towards the other focus, e.g. focus 110, and pass through that focus. For example, for the elliptical reflector 108 including a first focus 106 and a second focus 110, and an inner surface with mirror like properties, when an end of an input waveguide 102, i.e. an input port, of a photonic chip 104, is positioned at the first focus 106 of the elliptical reflector 108, then light beams leaving the end of the waveguide 102 will reflect off the inner surface of the elliptical reflector 108 towards the second focus 110, ultimately passing through the second focus 110.

Thus, elliptical mirrors can provide perfect (aberration-free) focusing between two foci. This can be applied to photonic chips by positioning one focus of the ellipse at the output of a waveguide, terminating into a slab, e.g. a silicon slab, and the other focus being the off-chip target, e.g. for sensing or LIDAR. As the distance to the target becomes greater and greater, e.g. in the limit of a target placed at infinity, the beams of light reflecting off the ellipse become more collimated and the ellipse becomes a parabolic mirror. Otherwise, for example, a target distance of 5 m would specify an ellipse with foci (−5 m, 0) and (0, y), where (0, y) is the coordinate of the waveguide output, perhaps (0, −5 mm). Non-zero y in either the elliptical or parabolic case creates an off-axis reflector where the output light is not blocked by the waveguide or any circuitry around it. In a LIDAR application, reflected light from the target is re-collected via the mirror into the waveguide, e.g. light is received via the same pathway the light follows as it is emitted from the waveguide. For some range of target distances around the design target distance, an acceptable amount of light is received back into the waveguide because defocus aberrations are sufficiently small. The elliptical or parabolic reflector can thus collimate light into a beam for a functional LIDAR system, as illustrated and described with reference to FIGS. 2A and 2B.

Figure 2A:
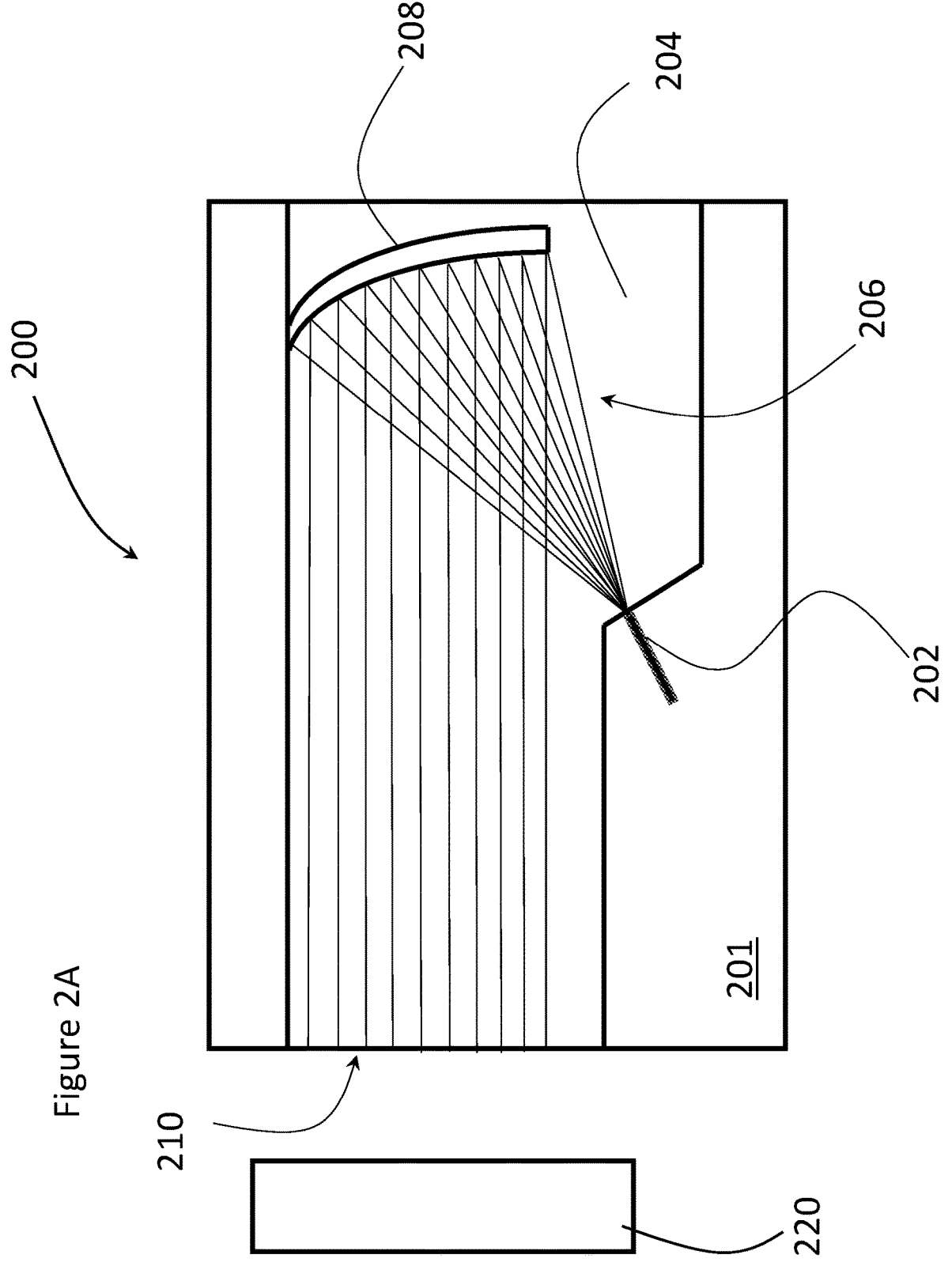
FIG. 2A is a top view of an implementation of mirror-based beamforming device, in accordance with embodiments of the present disclosure.

In FIG. 2A, a mirror-based beamforming device 200 provided on a simple photonic integrated circuit (PIC) chip 201 is illustrated, which includes a slab waveguide 204, e.g. dielectric silicon, with a reflector 208, e.g. mirror, that represents a portion of an ellipse, e.g. the reflector 208 may be manufactured with a specific curvature, as if it were a segment of a larger elliptical reflector having two foci. Although various curved embodiments of the elliptical reflector 208 may be used, an elliptical reflector 208 may provide greater results for point-to-point imaging. Only a small section of the overall ellipse may be needed as the elliptical reflector 208, if the selected ellipse parameters correspond to a very elongated ellipse, e.g. the elliptical reflector 208 may be less than a centimeter in width for a target located 50 meters away.

An end of an input waveguide 202, i.e. an input port, is positioned relative to the elliptical reflector 208, such that the end of the input waveguide 202 is located at a first focus of the overall ellipse that the elliptical reflector 208 is a segment of. The diverging light rays 206 leaving the input waveguide 202 enter the slab waveguide 204 and propagate until they strike off the elliptical reflector 208. More specifically, the slab waveguide 204 confines the light rays 206 in a first dimension, e.g. vertically, while enabling the light rays 206 to diverge in a second perpendicular dimension, e.g. horizontally.

Within the slab waveguide 204, the elliptical reflector 208 reflects the light rays 206 towards a chip facet 210 and collimates the light rays 206 at the same time. The light rays 206 then leave the chip 201 by exiting via the chip facet 210, e.g. an edge of the chip 201, towards the target (not shown) that would be located at the second focus for the ellipse incorporating the elliptical reflector 208. In this edge-emitting case, the light rays 206 may diverge perpendicular to the plane of the slab waveguide 204, and one or more off-chip cylindrical lenses or mirrors 220 may be placed after the chip 201 to collimate the beam of light rays 206. Light reflecting off the target at the second focus may enter back into the chip 201 along the same path, just in reverse, and may be re-collected via the elliptical reflector 208 into the waveguide 202.

The aforementioned mirror-based beamforming device 200 may result in a high-efficiency return light for LIDAR applications that is simpler and cheaper to implement. Furthermore, since the elliptical reflector 208 is in the chip 201, there is increased durability as there are no issues associated with a lens separate from the chip 201 and any air gap in-between, which might cause misalignment drift, and so forth.

Figure 2B:
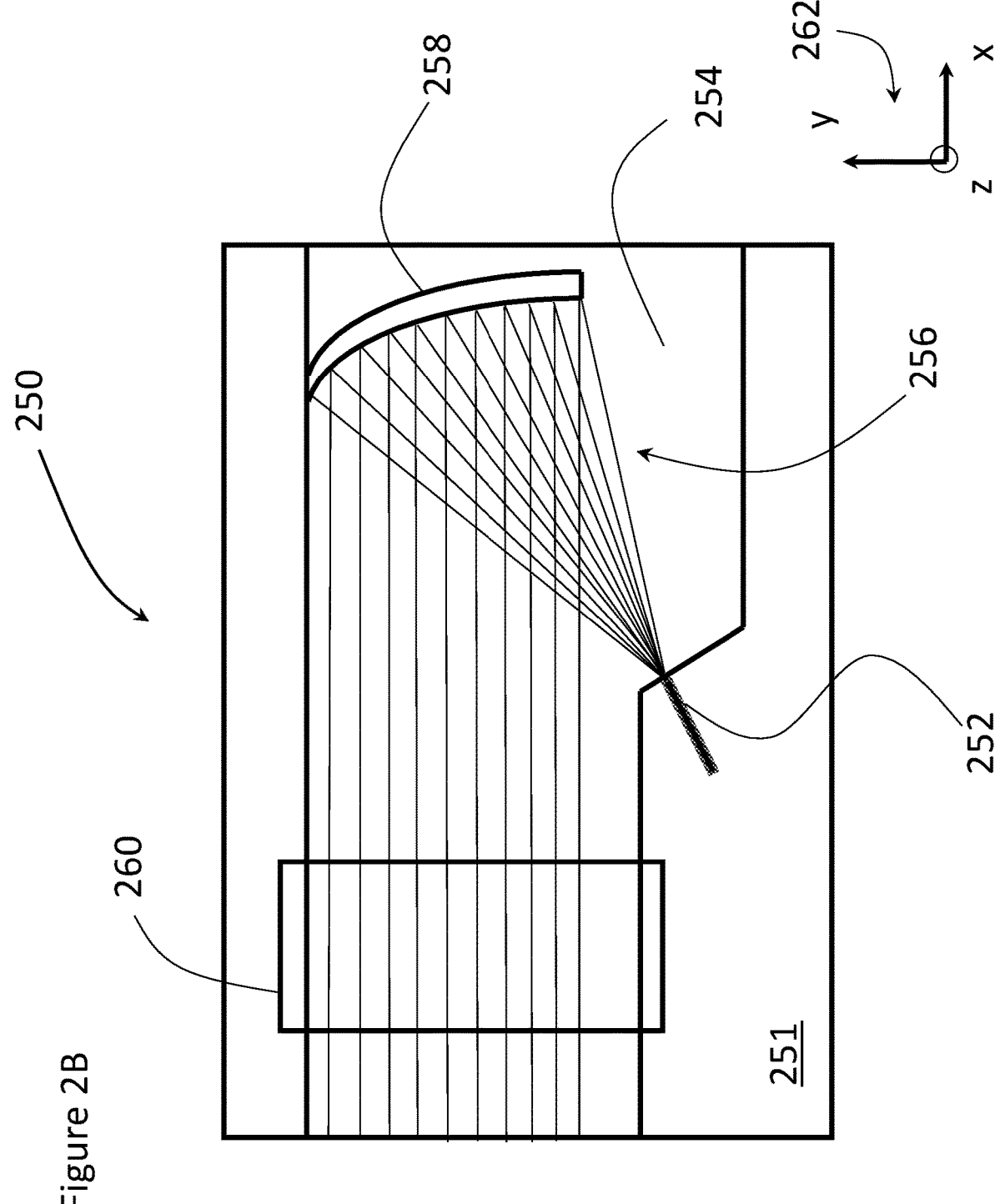
FIG. 2B is a top view of an implementation of a mirror-based beamforming device, in accordance with embodiments of the present disclosure.

A mirror-based beamforming device 250, illustrated in FIG. 2B, includes a photonic integrated circuit (PIC) chip 251, similar to the chip 201 shown in FIG. 2A, except that the chip 251 includes an additional grating 260 in or nearby a slab waveguide 254 that changes the output path of the light rays 256 once they strikes the elliptical reflector 258. More specifically, the photonic chip 251 includes the slab waveguide 254, e.g. a dielectric silicon slab, with an elliptical reflector 258, e.g. mirror, that represents a segment of an overall ellipse. An end of an input waveguide 252 is positioned relative to the elliptical reflector 258, such that the end of the input waveguide 252 is located at a first focus of the overall ellipse that the elliptical reflector 258 is a segment of. The diverging light rays 256 leaving the input waveguide 252 enter the slab waveguide 254 and propagate until they reflect off the elliptical reflector 258. An output grating 260 is positioned in the portion of the slab waveguide 254 that is traversed by the light rays 256 after they reflect off the elliptical reflector 258. The light rays 256 may then escape the chip 251 out of the output grating 260 at an acute angle to the plane of the slab waveguide 254, e.g. in a direction coming out of the page, tilted in the X-Z plane defined by the coordinate system 262, and leave the chip 251 already collimated or focused, depending on the design of the output grating 260. The grating 260 enables steering of the beam in one axis, e.g. in the X-Z plane, a rotation about the Y-axis, by changing the wavelength of the emitted light. Additional steering in the perpendicular axis to the grating 260, e.g. in the X-Y plane, may be performed by having the light beams be emitted from differently positioned waveguides in the (X-Y) plane of the slab waveguide 254, and an embodiment with this design is shown and discussed in regard to FIG. 3. Thus, varying the light wavelengths with the output grating 260, along with the use of a waveguide array, may enable beam steering in two directions. In either case, further steering may be done by placing an external tilting or moving mirror off-chip in the beam path. Beam steering may be important for LIDAR applications to move the beam around and enable imaging of the surrounding environment, e.g. reflecting light off various targets, without moving any physical parts, e.g. such as moving the chip itself with a rotating motor.

Figure 3:
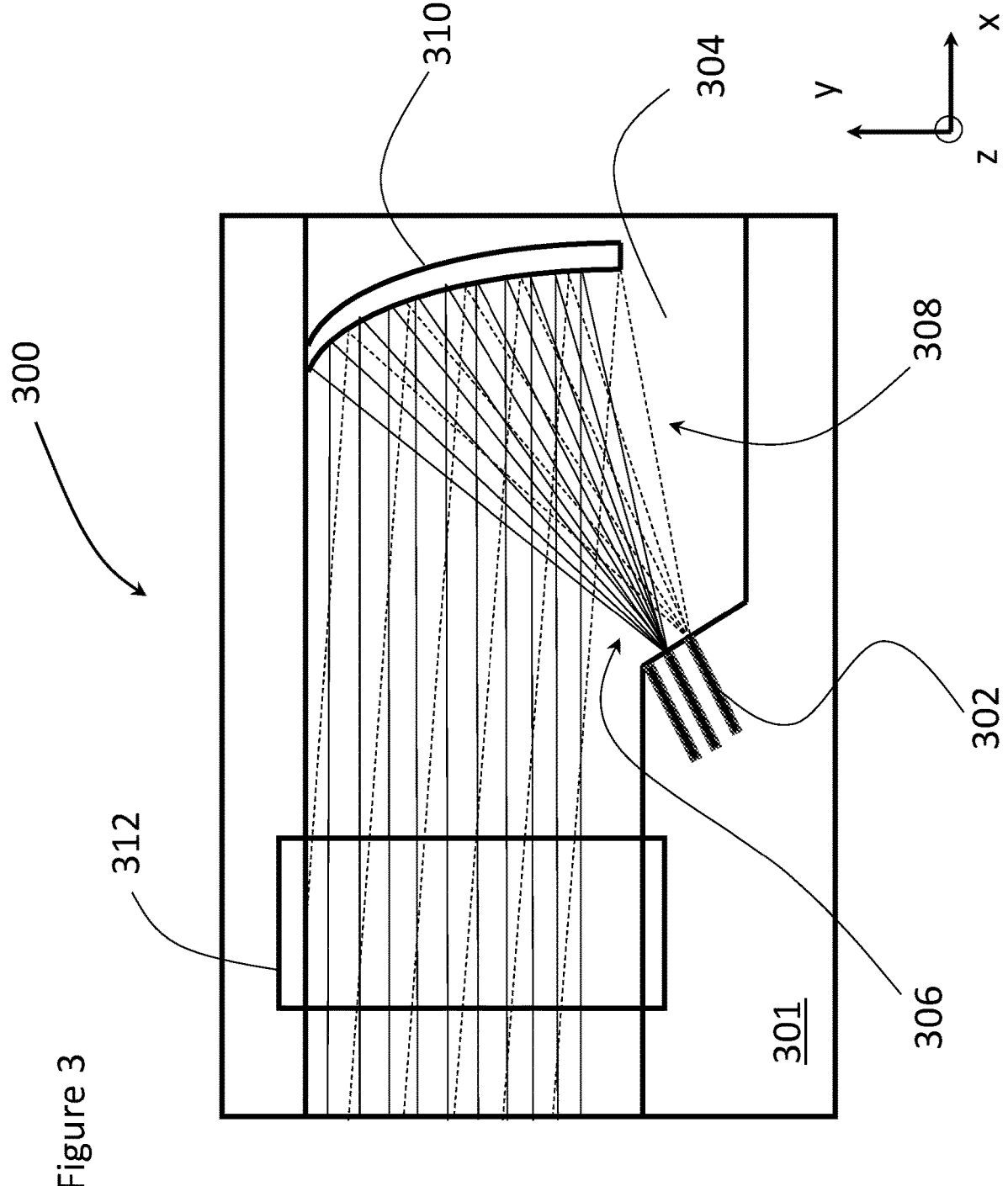
FIG. 3 is a top view of an implementation of a mirror-based beamforming device, in accordance with embodiments of the present disclosure.

With reference to FIG. 3, a mirror-based beamforming device 300 includes a photonic integrated circuit (PIC) chip 301 with output grating 312, which may utilize more than one waveguide in a waveguide array 302 in the plane of a slab waveguide 304 in order to enable beam steering in the perpendicular axis to the grating 312. The photonic chip 301 includes the waveguide slab 304 with an elliptical reflector 310, e.g. elliptical mirror, that represents a segment of an overall ellipse. The waveguide array 302 may comprises a plurality of waveguides positioned relative to the elliptical reflector 310 such that the ends of the waveguides, i.e. input ports, in the waveguide array 302 are located at a focus of the overall ellipse that the elliptical reflector 310 is a segment of. The illustrated example in FIG. 3, shows two different sets of light rays, rays 306 and rays 308, being emitted from two different waveguides of the waveguide array 302. Since these two different sets of light rays are emitted from slightly different locations, they have slightly different paths as they reflect off the elliptical reflector 310 and pass through the output grating 312. In other words, after striking the elliptical reflector 310, light from each waveguide of the waveguide array 302 is collimated but travelling at a different angle out the output grating 312. Thus, the angle relative to the output grating 312 that the light leaves at may be controlled based on which waveguide in the waveguide array 302 the light is emitted from. Although not pictured, this concept of beam steering using the waveguide array 302 may also be used without the output grating 312, e.g. with the light beams leaving the edge or chip facet 210 of the chip 201, as in FIG. 2A. In some embodiments, light may be emitted from different waveguides of the waveguide array 302 in a simultaneous manner, or emitted in a sequential manner and the switching may be done quickly enough that the light beams may be used to obtain an image of the surrounding environment, e.g. for LIDAR applications. Because an elliptical mirror is only aberration-corrected for light passing through its two foci, and not off-axis light, at most one waveguide of the waveguide array 302 will emit an aberration-free beam. Waveguides not at the focus will experience multiple aberrations, in particular coma. In some embodiments, the reflector 310 may have a non-elliptical shape, e.g. spherical or arbitrary aspheric shapes, such that aberrations are improved for multiple waveguides.

Figure 6:
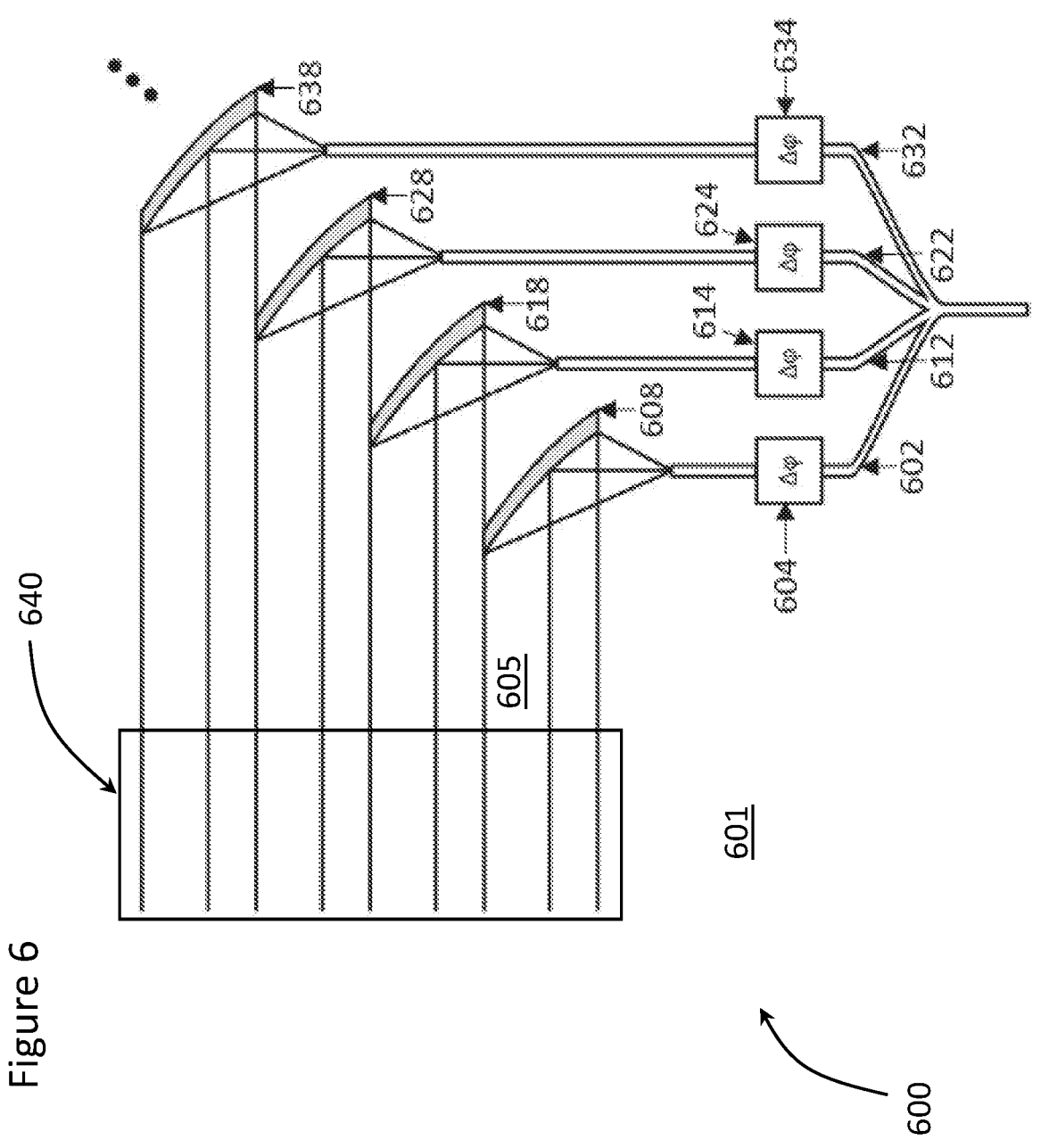
FIG. 6 is a top view of an implementation of a mirror-based beamforming device with wavefront error correction, in accordance with embodiments of the present disclosure.

In some embodiments, it may be preferable to use more than one reflector 208, 258, or 310, see FIG. 6, arranged in sequence, such that the light rays 206, 256, or 308 bounce off of multiple reflectors before exiting the chip 201, 251 or 301, via chip facet 210 or grating 260 or 312. These reflectors may be of various spherical or aspheric shapes to correct aberrations, flatten the field of focus, or change the intensity distribution of, i.e. apodize, the emitted beam.

Figure 4A:
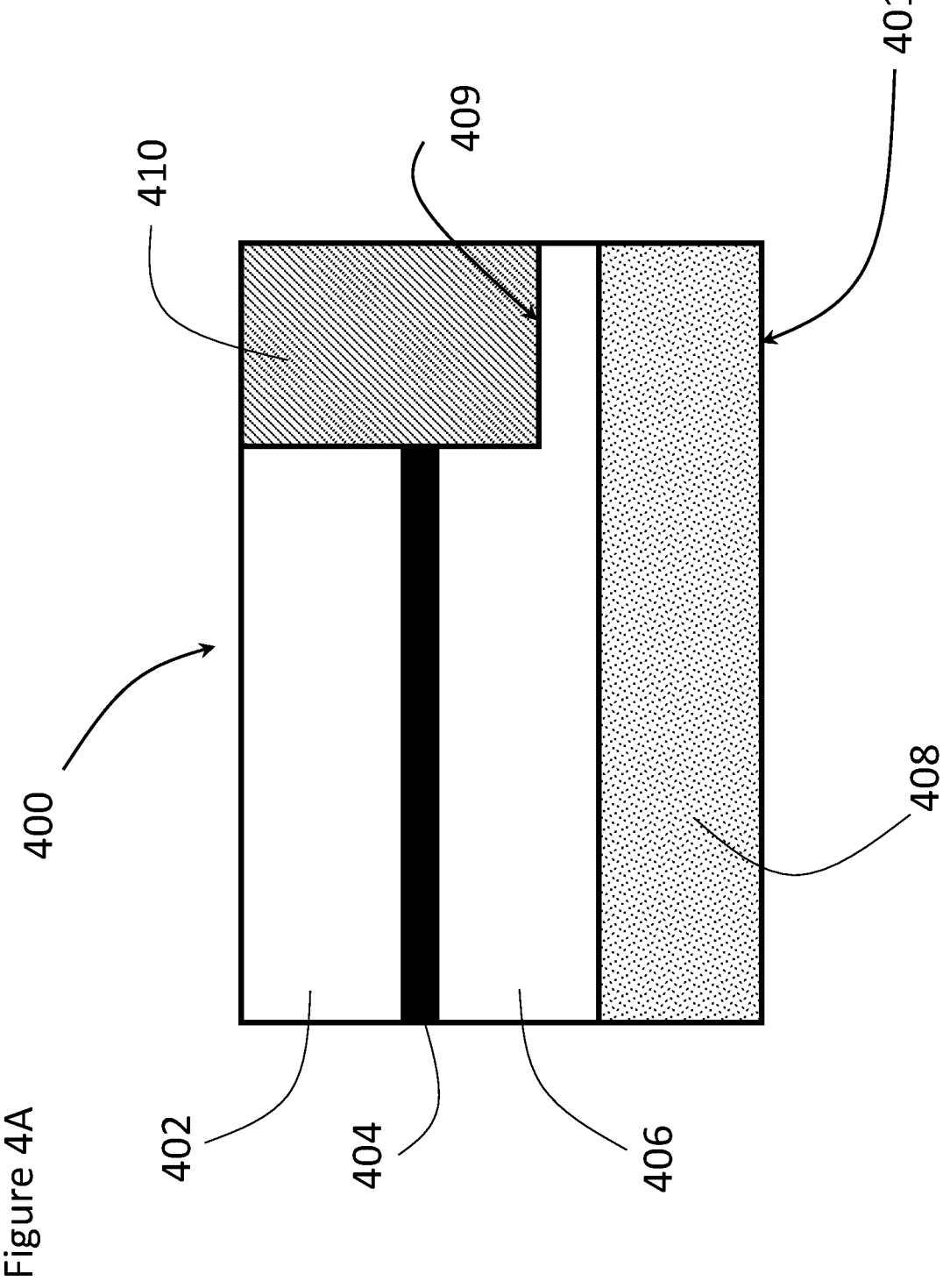
FIG. 4A is a vertical cross-sectional view of an on-chip mirror-based beamforming device, in accordance with embodiments of the present disclosure.
Figure 4B:
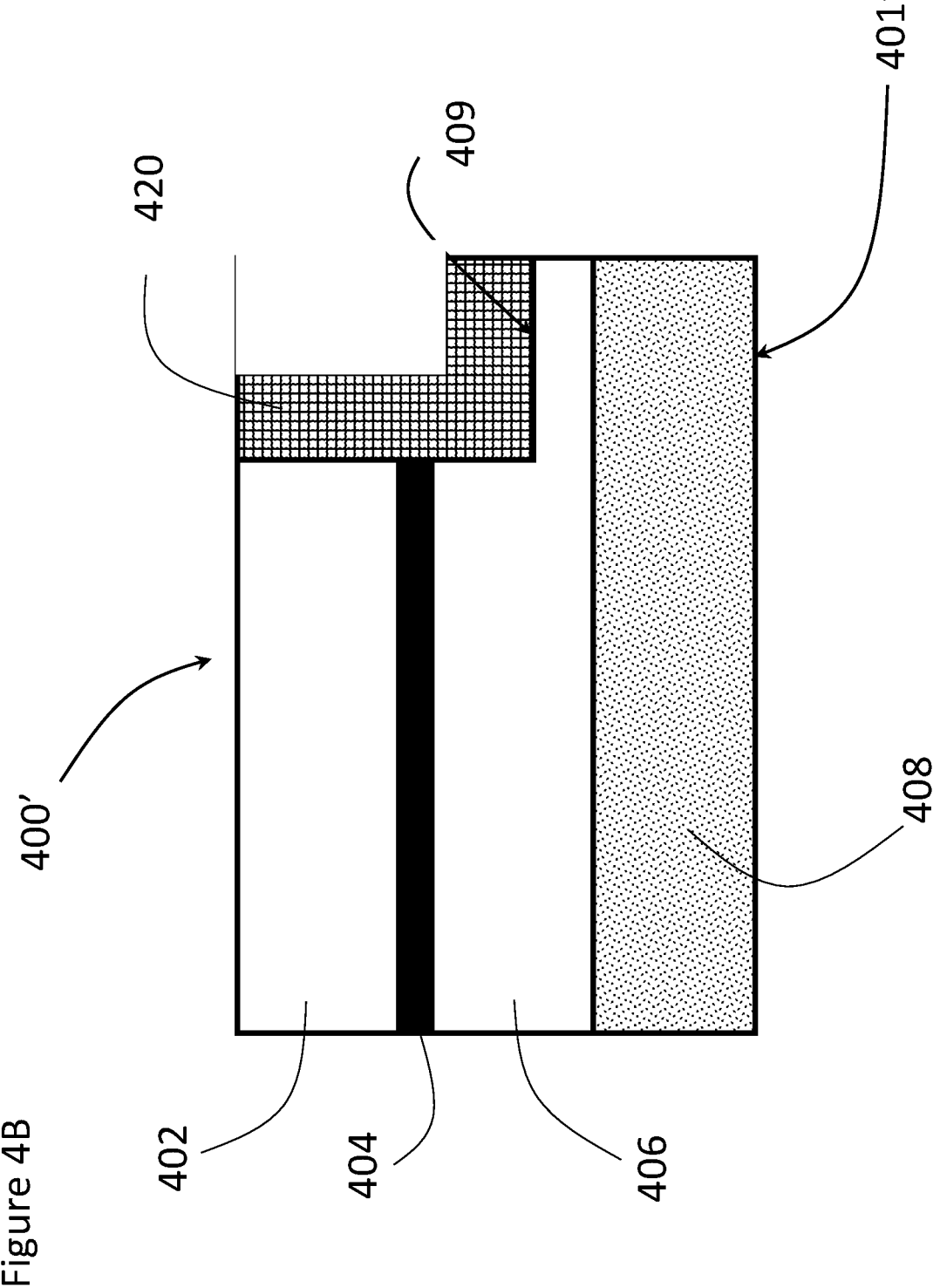
FIG. 4B is a vertical cross-sectional view of an on-chip mirror-based beamforming device, in accordance with embodiments of the present disclosure.
Figure 4C:
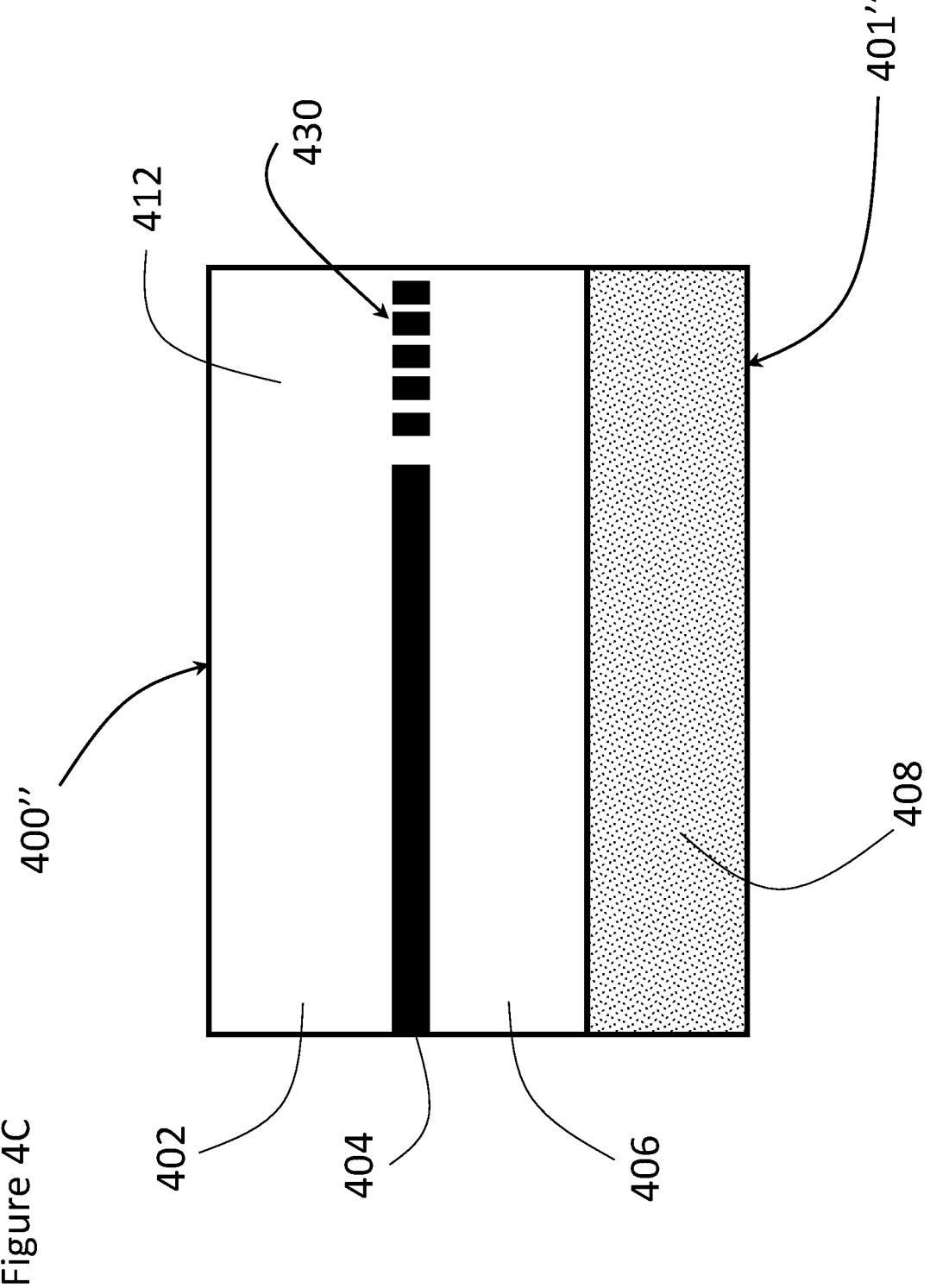
FIG. 4C is a vertical cross-sectional view of an on-chip mirror-based beamforming device, in accordance with embodiments of the present disclosure.
Figure 4D:
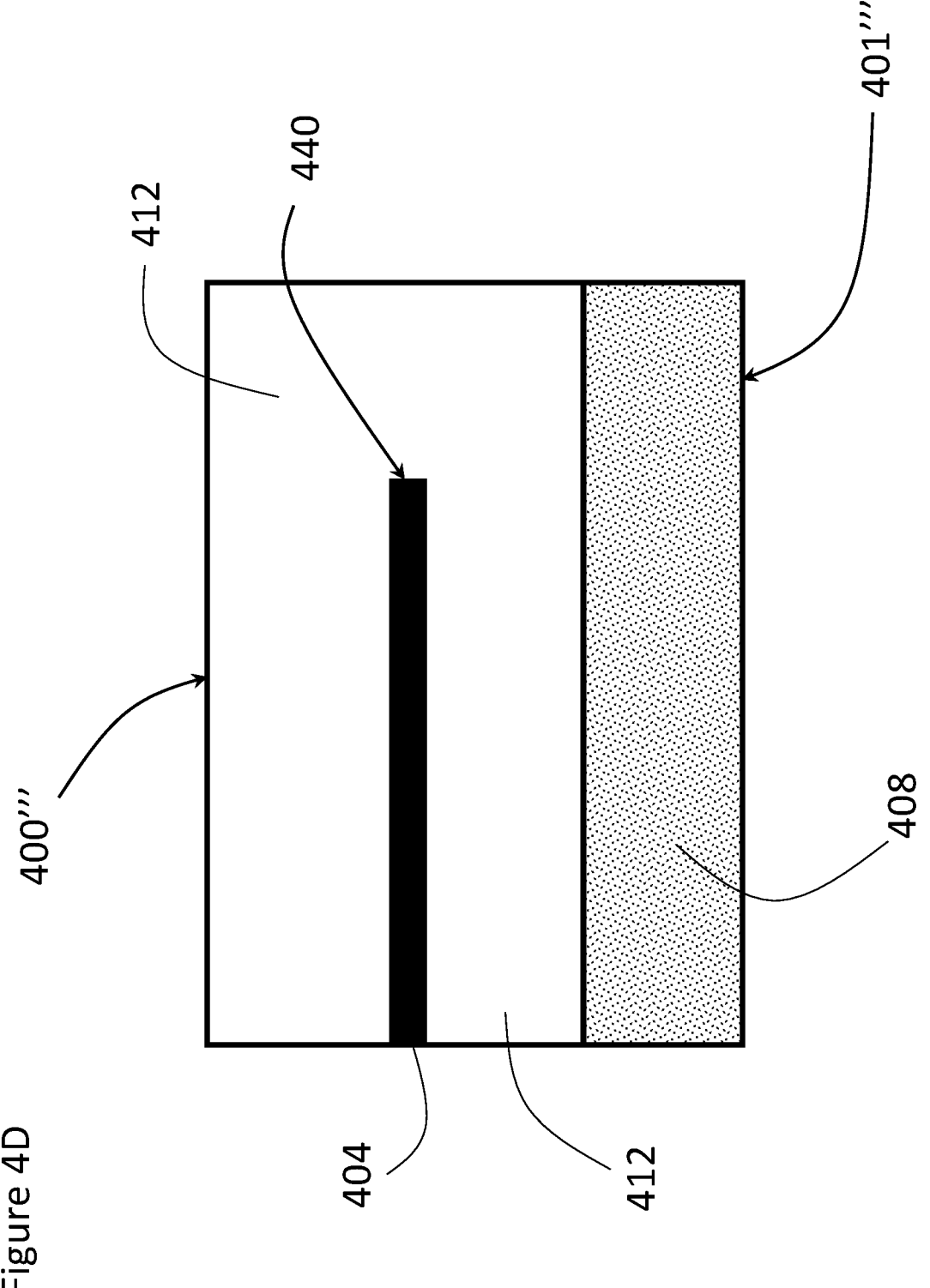
FIG. 4D is a vertical cross-sectional view of an on-chip mirror-based beamforming device, in accordance with embodiments of the present disclosure.

FIGS. 4A-4D illustrate vertical cross-sectional views of various mirror-based beamforming devices that on-chip elliptical reflectors 208, 258 or 310, e.g. the elliptical reflectors shown in FIGS. 2A, 2B, and 3, may be used in the fabrication thereof. FIGS. 4A-4C illustrate some of the layers that may be deposited in a mirror-based beamforming device 400, e.g. similar to mirror-based beamforming devices 200, 250 and 300, including (from top to bottom) an upper cladding 402, e.g. an oxide such as silicon dioxide; a slab waveguide 404, e.g. comprised of a suitable waveguide material such as silicon or silicon nitride; a lower cladding 406, e.g. comprised of an oxide or dielectric such as silicon dioxide; and a handle wafer or substrate 408, e.g. comprised of silicon. In FIG. 4D, the slab waveguide 404 may not take up the entire layer, which means the upper cladding 402 and the lower cladding 406 may fill in portions of the layer occupied by the slab waveguide 404 and therefore form a singular continuous layer.

In FIG. 4A, a mirror-based beamforming device 400 includes a photonic integrated circuit (PIC) chip 401 including an elliptical reflector 410, e.g. elliptical mirror, which may be provided by etching a trench 409 through the upper cladding layer, the slab waveguide 404 and into the lower cladding 406, and then either filling or coating the sidewalls of the trench 409 with a reflective material, e.g. deposited metal, to form an elliptical reflective surface, e.g. elliptical reflector 410. The trench 409 must extend sufficiently below the slab waveguide 404 into the lower cladding 406 to reflect the entire mode area of the light. Various metals may be used for the elliptical reflector 410, including silver, aluminum, copper and gold.

Alternatively, as illustrated in FIG. 4B, a mirror-based beamforming device 400' includes a photonic chip 401' comprising a deposited Bragg reflector 420, which may be provided by etching the trench 409 through the slab waveguide 404, and depositing alternating layers of low-index and high-index material to form a reflector, i.e. the Bragg reflector 420, for the wavelengths of interest. The low-index and high-index material layers typically have a thickness of $\lambda/(4n)$, where $\lambda$ is the vacuum wavelength of the light and n is the refractive index of the layer.

Alternatively, in FIG. 4C, a mirror-based beamforming device 400" includes a photonic integrated circuit (PIC) chip 401″ comprising a similar Bragg reflector concept, which may be provided by forming the alternating low and high index layers by patterning the slab waveguide 404 itself, e.g. alternating the effective index seen by the slab mode, rather than the trench and fill technique, in order to result in an etched slab Bragg mirror 430.

Finally, with reference to FIG. 4D, a mirror-based beam-forming device 400‴ includes a photonic integrated circuit (PIC) chip 401‴, in which the slab waveguide 404 is simply terminated in the desired shape of the reflective surface, e.g. mirror 440, and thus, the upper cladding 402 and the lower cladding 406 may be a single unit of cladding 412. This approach uses the total internal reflection at a junction between the higher-index material in the slab waveguide 404 and the lower-index material in the cladding 412. The mirror design in this embodiment may enable all the light that strikes the mirror 440 to strike at glancing angles, greater than the critical angle for total internal reflection.

It should be noted that, in all the embodiments previously shown, the wavefront of the emitted light beam may become distorted because it accumulates phase errors as it propagates through the slab waveguide 404 or the grating 420 or 430. For example, variations in slab thickness, index, or temperature, may cause one part of the beam to be delayed in phase relative to the rest of the beam. The resulting wavefront error causes resolution loss in imaging and lowers the amount of returned light coupling back into a single mode waveguide for LIDAR application. It may be necessary to correct this wavefront error through a number of different methods, and various such methods are shown and discussed with regards to FIGS. 5, 6, and 7A-7B.

Figure 5:
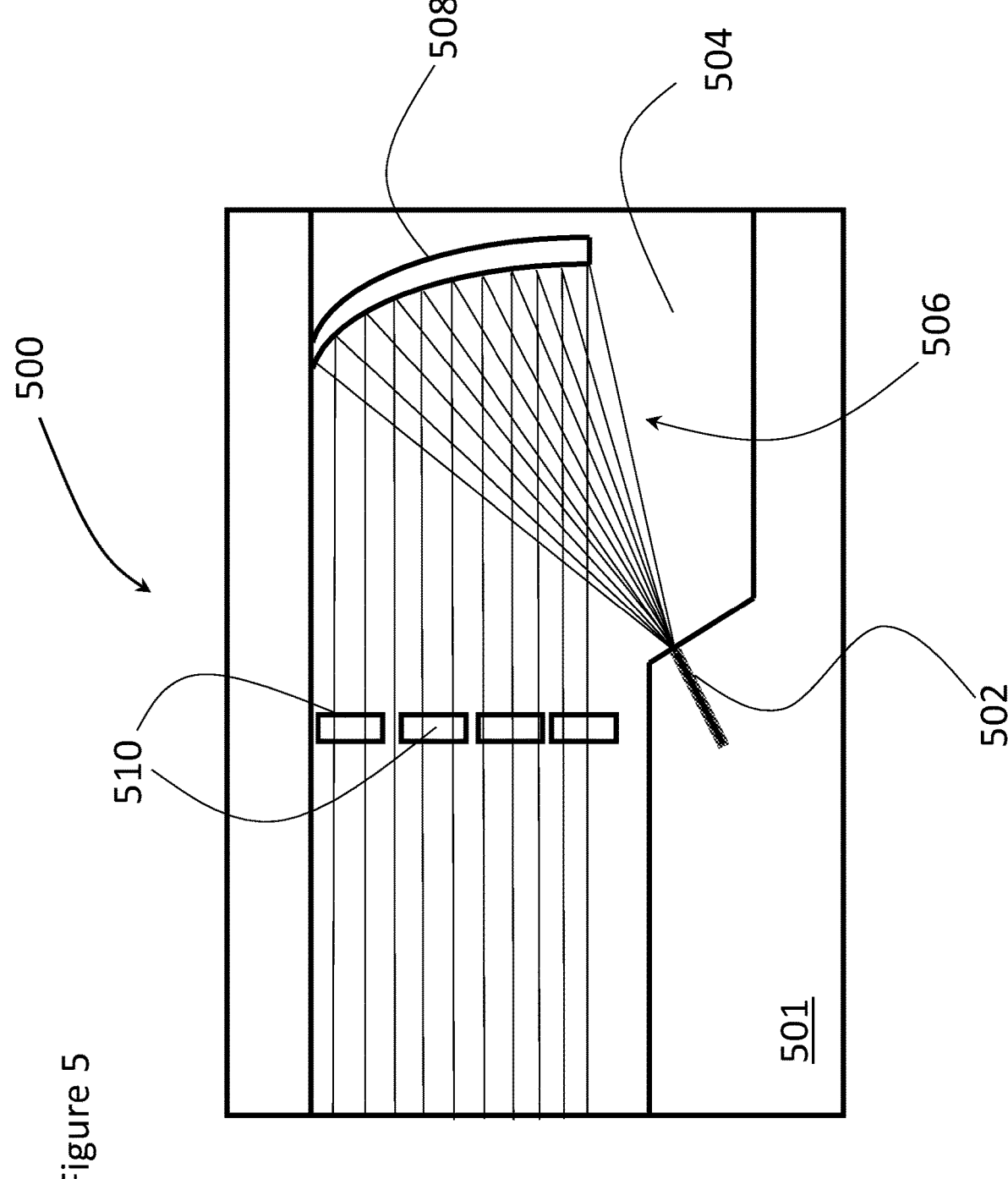
FIG. 5 is a top view of an implementation of a mirror-based beamforming device with wavefront error correction, in accordance with embodiments of the present disclosure.

FIG. 5 is a top view of a mirror-based beamforming device 500 on a photonic integrated circuit (PIC) chip 501 including wavefront error correction, in accordance with embodiments of the present disclosure. As before, light beams 506 launched from an input port, e.g. an end of a waveguide 502, positioned at a first focus of an overall ellipse and diverge and propagate through a slab waveguide 504 before reflecting off an elliptical reflector 508, e.g. an elliptical mirror, which forms a segment of the overall ellipse. The second focus of the overall ellipse may be far enough away, e.g. greater than 4 m, such that the wavefronts of light leaving the chip appear flat to within some tolerance (e.g. ¹⁄₂₀ of the wavelength), i.e. the light beams appear substantially collimated. Typically, for light to appear collimated, the second focus may be in the Fraunhofer far field, i.e. farther away than W²/λ, where W is the beam width and λ is the operating wavelength. A section of the slab waveguide 504 that the light beams pass through after being incident, e.g. reflecting off of, the elliptical reflector 508 may be heated in two or more segments by placing resistive heating elements 510, e.g. thermal phase shifters, nearby the slab waveguide 504 and running a tunable current through each heating element 510. Each of the heating elements 510 locally heats, and thereby tunes the index of, the slab waveguide 504 below, which phase shifts the section of light travelling underneath that heating element 510. Any form of launching the light from the chip 501 may be utilized including any of the aforementioned means, e.g. chip facet 210, output grating 260 or 312.

FIG. 6 is a top view of another mirror-based beamforming device 600 on a photonic integrated circuit (PIC) chip 601 including wavefront error correction, in accordance with embodiments of the present disclosure. For the photonic chip 601, a splitter, e.g. a 1×4 splitter, is used to divide the input beam of light into a plurality, e.g. four, sub-beams. The elliptical reflector, e.g. elliptical mirror, is divided into multiple sections 608, 618, 628 and 638, and each section of the reflector is arranged with a separate corresponding waveguide 602, 612, 622 and 632. Each elliptical reflector segment 608, 618, 628, and 638 is configured to have one focus at the corresponding waveguide 602, 612, 622, and 632, and the second focus at the target. The second focus of the overall ellipse may be far enough away, e.g. greater than 4 m, such that the light beams appear collimated, as defined above. Particularly in this case where the overall focus is far away, each of 608, 618, 628, and 638 would have an identical shape. A respective phase shifter 604, 614, 624 and 634 is placed over each corresponding waveguide 602, 612, 622 and 632, prior to launching the corresponding sub-beam towards the corresponding elliptical reflector section 608, 618, 628 and 638, which enables phase shifting of each sub-beam. As in the embodiment shown in FIG. 5 with the segmented heating elements 510, a pattern of phase shifts may be applied via the voltage or current applied to the phase shifters 604, 614, 624 and 634. The phase shifts may be used to pre-distort the output wavefront of the sub-beams so that, after picking up phase errors in the slab waveguide 605 or grating 640, if included, the sub-beams exit the chip 601 correctly aligned. Since most phase errors encountered are slowly varying in space, a relatively coarse correction is sufficient to fully correct the beam of light. For instance, effective wavefront error correction may be implemented with between two and sixteen phase shifters, e.g. heating elements, 604, 614, 624 and 634 and/or reflector sections 608, 618, 628 and 638.

More specifically, in FIG. 6, light from the waveguide 602 passes through the phase shifter 604 before launching at the reflector section 608, light in the waveguide 612 passes under the phase shifter 614 before launching at the reflector section 618, light in the waveguide 622 passes under the phase shifter 624 before launching at the reflector section 628, and light in the waveguide 632 passes under the phase shifter 634 before launching at the reflector section 638. The end result is a wavefront error correction similar to the one obtained in the embodiment shown in FIG. 5, except that the phase shifting occurs prior to the light reflecting off the reflector sections 608, 618, 628 and 638 rather than afterwards.

While FIGS. 5 and 6 present ways to dynamically correct or at least partially compensate for wavefront errors with electronically-controlled phase shifts, an alternative method is to physically correct the wavefront errors. The correction may be done by fabricating a static corrector layer 706 on top of a photonic integrated circuit (PIC) chip 701. In some embodiments, the corrector layer 706 may be a corrector plate that is mounted on the top of the chip 701. The corrector layer 706 may have patterned variable depth or thickness, such that light in different sections of the beam receives different phase delays. The proper pattern for the corrector layer 706 may be determined by first fabricating the photonic chip 701, including the layers of the slab waveguide 404, gratings 704, and upper and lower cladding 402 and 406 on substrate 408, then measuring the emitted wavefront. Wavefront measurement may be done with standard techniques such as interferometry or a Shack-Hartmann sensor. An inverse correction pattern may be calculated to pattern into the corrector layer 706, so that the optical path length differences nL, where n is the index of the corrector layer 706 and L is the local thickness along the propagation direction, cancel the measured phase errors. This correction pattern is then defined in the corrector layer 706. Various ways of implementing this corrector layer are shown in FIGS. 7A and 7B.

Figure 7A:
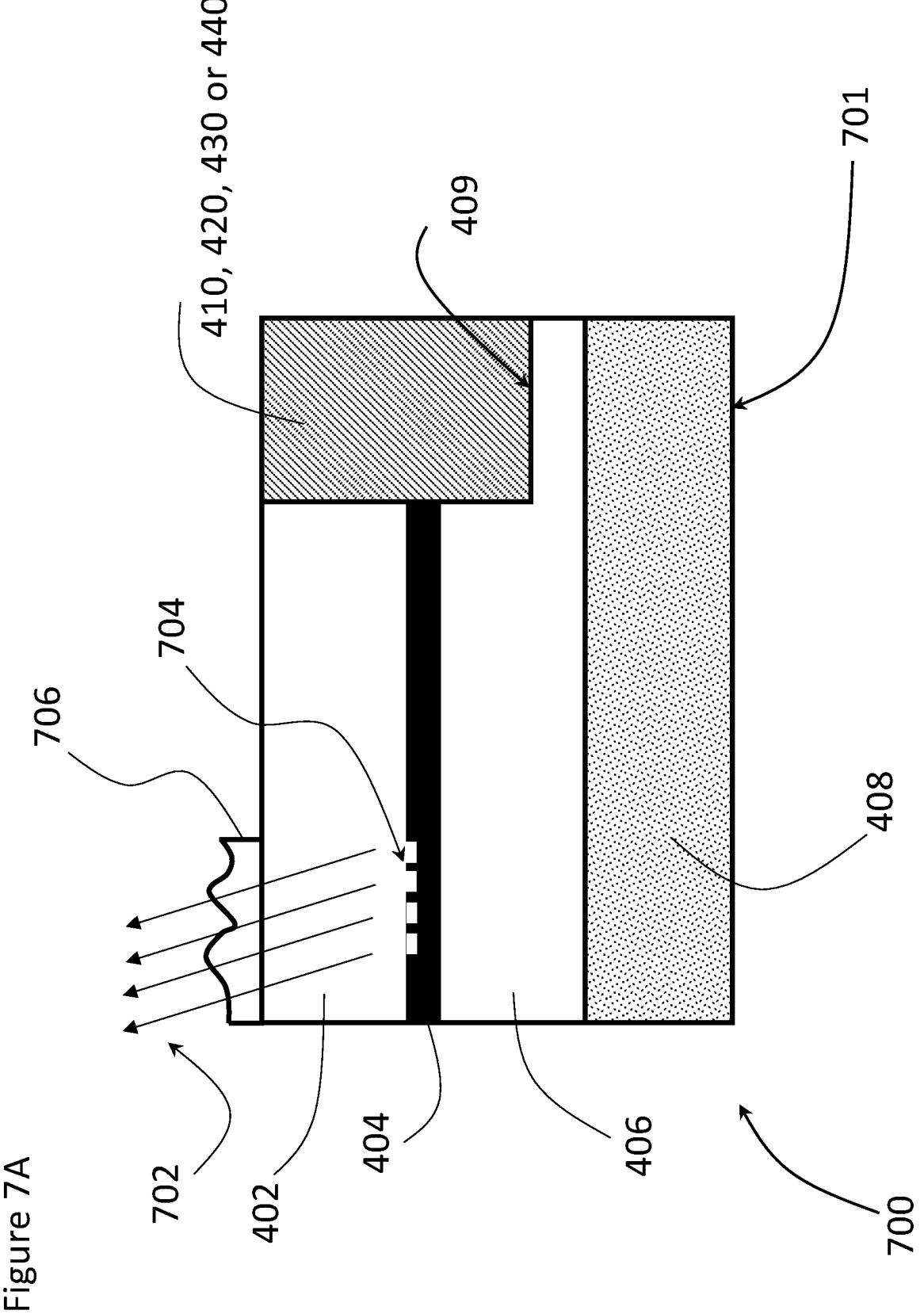
FIG. 7A is a vertical cross-sectional view of a mirror-based beamforming with wavefront error correction, in accordance with embodiments of the present disclosure.

With reference to FIG. 7A, a mirror-based beamforming device 700 fabricated on a photonic integrated circuit (PIC) chip 701 includes the corrector layer 706, e.g. corrector plate, for wavefront error correction. The corrector layer 706 may be fabricated on top of the upper cladding 402 by spin-coating the upper layer of the PIC chip 701 with a light-sensitive material or photoresist, like SU-8 epoxy, then greyscale lithography may be used to pattern the variable thickness of the deposited material. A laser beam may be raster-scanned across the corrector layer 706, varying the dwell time or power of the laser beam to create different thicknesses. This SU-8 3D-patterned corrector layer 706 serves as a corrector plate that is placed atop the chip 701, such that emitted light 702 passing through the grating 704 passes through the corrector layer 706.

Figure 7B:
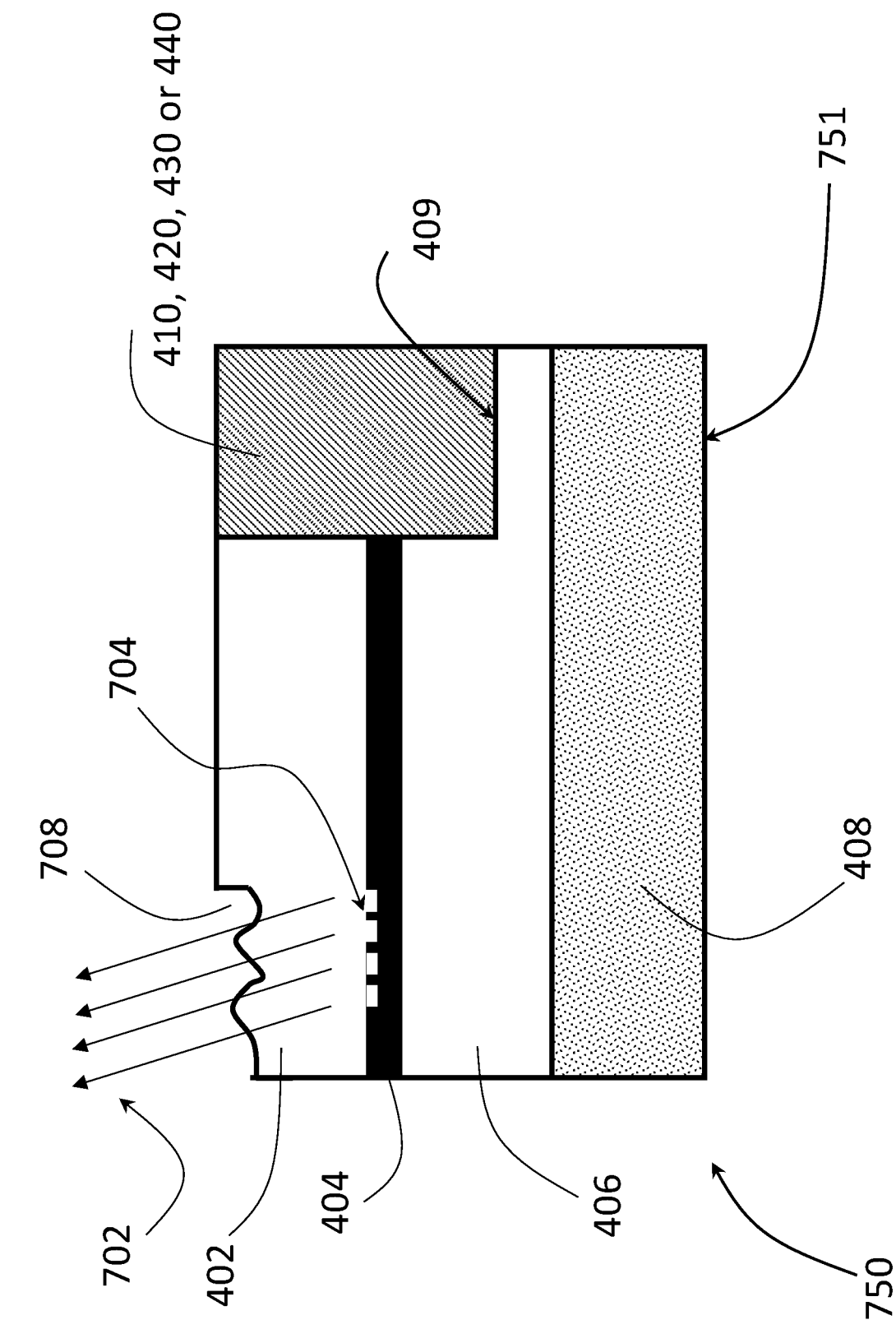
FIG. 7B is a vertical cross-sectional view of a mirror-based beamforming device with wavefront error correction, in accordance with embodiments of the present disclosure.

FIG. 7B illustrates a mirror-based beamforming device 750 integrated in a photonic integrated circuit (PIC) chip 751 including an etched corrector surface 708 for wavefront error correction. Greyscale lithography may be used to form the same photoresist, e.g. corrector layer 706, described in FIG. 7A, except rather than leaving the photoresist material to be a permanent part of the PIC chip 751, it may be used as a mask to etch the correction pattern on the etched corrector surface 708 into the upper cladding of the PIC chip 751. Thus, emitted light 702 passing through the grating 704 passes through the etched corrector surface 708 etched directly into the upper cladding 402, which performs the wavefront error correction. The elliptical reflector may be any of the aforementioned elliptical reflectors, e.g. elliptical reflectors 410, 420, 430 and 440.

The mirror-based beamforming devices, e.g. 200, 250, 300, 400, 500, 600, 700, 750, hereinafter mirror-based beamforming device 804, described herein for beam collimation and wavefront-correction may be combined with a LIDAR core 801 to form a LIDAR (Light Detection and Ranging) sensing device 800. The LIDAR core 801, comprised of relevant waveguide components, may be optically coupled to the launch waveguide 802 forming the LIDAR sensing device 800. One such arrangement is shown and described in regard to FIGS. 8A-8C.

Figure 8A:
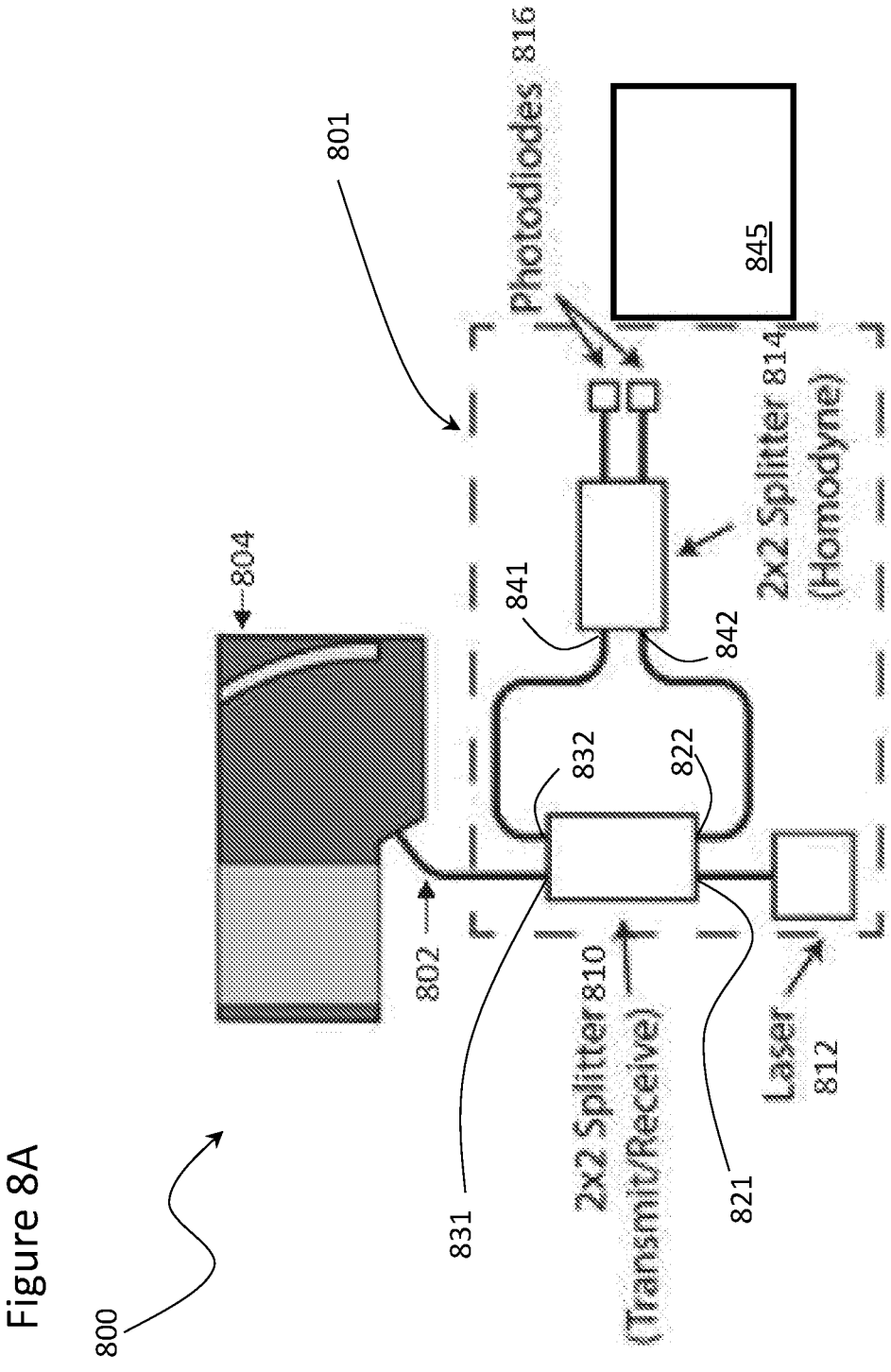
FIG. 8A is a top view of a photonic chip and waveguide components for LIDAR sensing, in accordance with embodiments of the present disclosure.
Figure 8B:
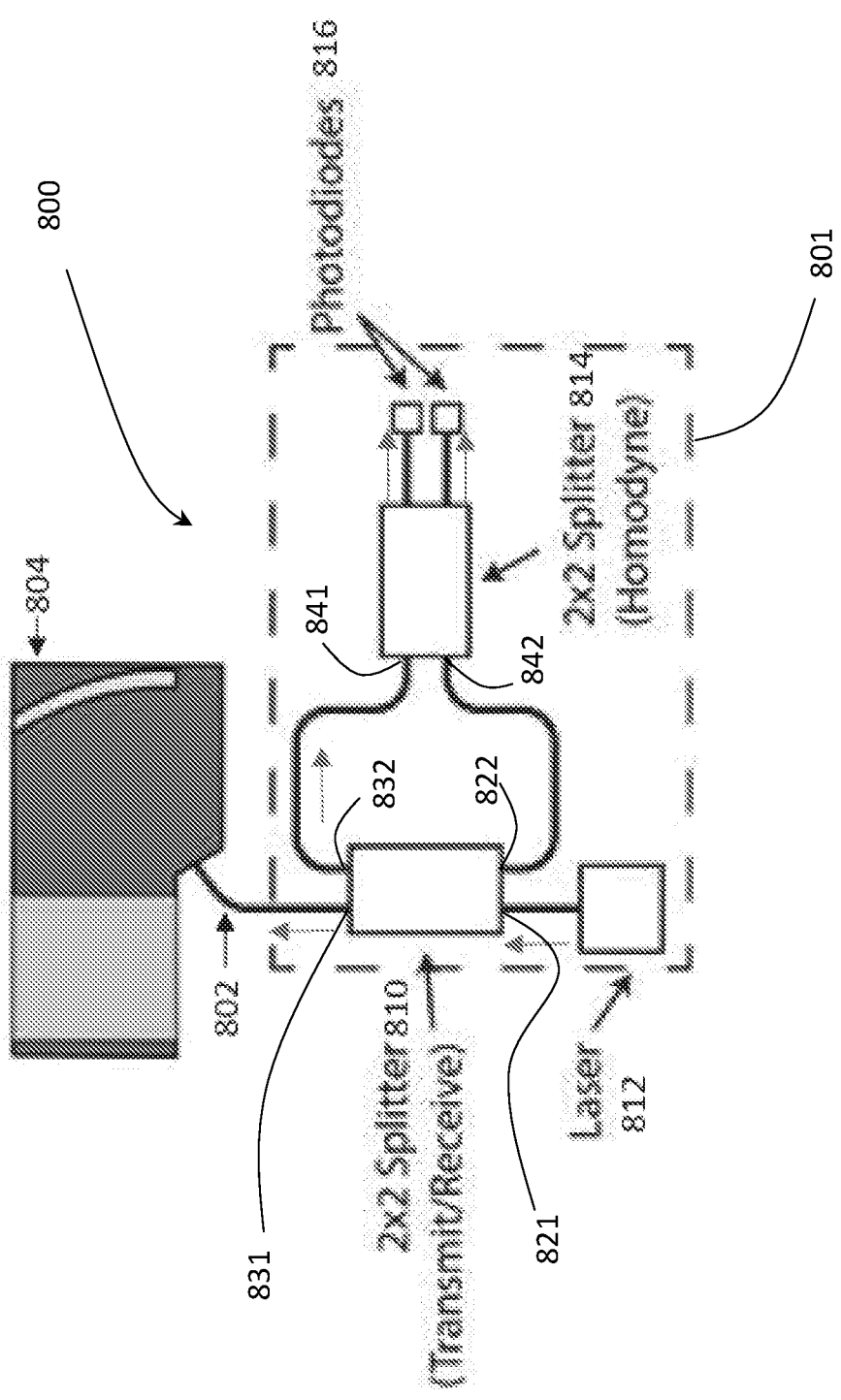
FIG. 8B is a top view of a photonic chip and waveguide components for LIDAR sensing, in accordance with embodiments of the present disclosure.
Figure 8C:
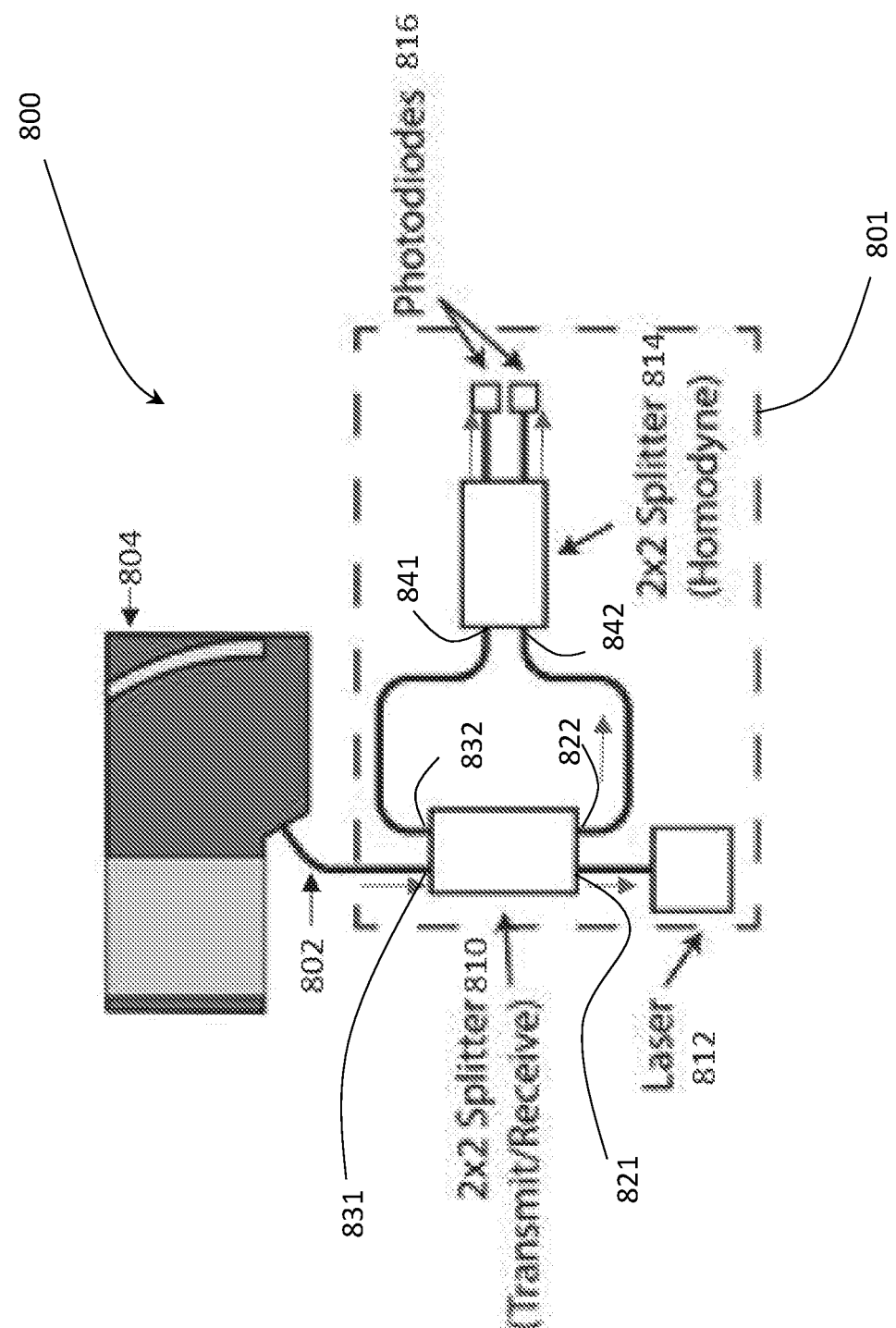
FIG. 8C is a top view of a photonic chip and waveguide components for LIDAR sensing, in accordance with embodiments of the present disclosure.

With reference to FIGS. 8A to 8C, the launch waveguide 802 of any one of the aforementioned mirror-based beamforming devices, e.g. 200, 250, 300, 400, 500, 600, 700, 750, may be connected to a first output of 831 of a beam director 810, e.g. a first splitter such as a 2×2 coupler. A first input 821 of the beam director 810 may be connected to a laser source 812, which generates and the provides the beams of light. A second input 822 and a second output 832 of the beam director 810 may be connected to first and second inputs 841 and 842 of a second splitter 814, e.g. a 2×2 coupler. First and second outputs of the second splitter 814 may be connected to one or more photodetectors, e.g. a first photodetector 816 and a second photodetector 816, respectively. Optionally, one of the first and second photodetectors 816 may be omitted. Differences in laser return times and wavelengths may then be used by a controller 845 connected to the photodetectors 816 to make a digital 3-D representations of the target, according to any known technique commonly practiced. This arrangement of beam directors 810 and splitters 814, laser source 812, and the photodetectors 816 may be referred to as a "LIDAR core."

With particular reference to FIG. 8C, the aforementioned arrangement may also enable optical homodyne detection of light received in the mirror-based beamforming devices, e.g. 200, 250, 300, 400, 500, 600, 700, 750. The second output 832 of the beam director 810 provides a portion of the light from the light source 812 as local oscillator (LO) light to the second splitter 814 (FIG. 8B) for comparison with the returning input light. The second input 822 of the beam director 810 carries the received input light from the mirror-based beamforming devices to be sensed (FIG. 8C). Typically, the optimum splitting ratio for the beam director 810 is 50:50. In the case of two photodetectors 816, the typical optimum splitting ratio for the second splitter 814 is 50:50. In the case of one photodetectors 816, the typical optimum splitting ratio for the second splitter 814 is nearly 90:10, coupling 90% of the received light and 10% of the LO to the single photodetector 816. The laser source 812 may be a tunable laser, whereby the angle of light emitted via a grating changes depending on the wavelength of the laser source 812.

FIG. 8B illustrates via arrows the outgoing path traveled by the light generated by the laser source 812. The light travels from the laser source 812 to the beam director 810. Some of the light output from the beam director 810 leaves the launch waveguide 802 and out the mirror-based beamforming devices 804 towards the target, as described in previous embodiments. The remainder of the light output from the beam director 810 goes towards the second splitter 814 as the LO, where it is split into outputs sent to the pair of photodetectors 816.

FIG. 8C illustrates via blue arrows the incoming path traveled by light that is reflected off the target and received by the mirror-based beamforming devices 804 in the reverse path. The received light travels down the waveguide 802 into the beam director 810, which splits the light. Part of the light goes to the laser source 812, which is ignored. The other part of the light goes to the second splitter 814, which further splits that received light into outputs sent to the pair of photodetectors 816. As previously mentioned, this arrangement allows for very sensitive detection of the received light.

Figure 9A:
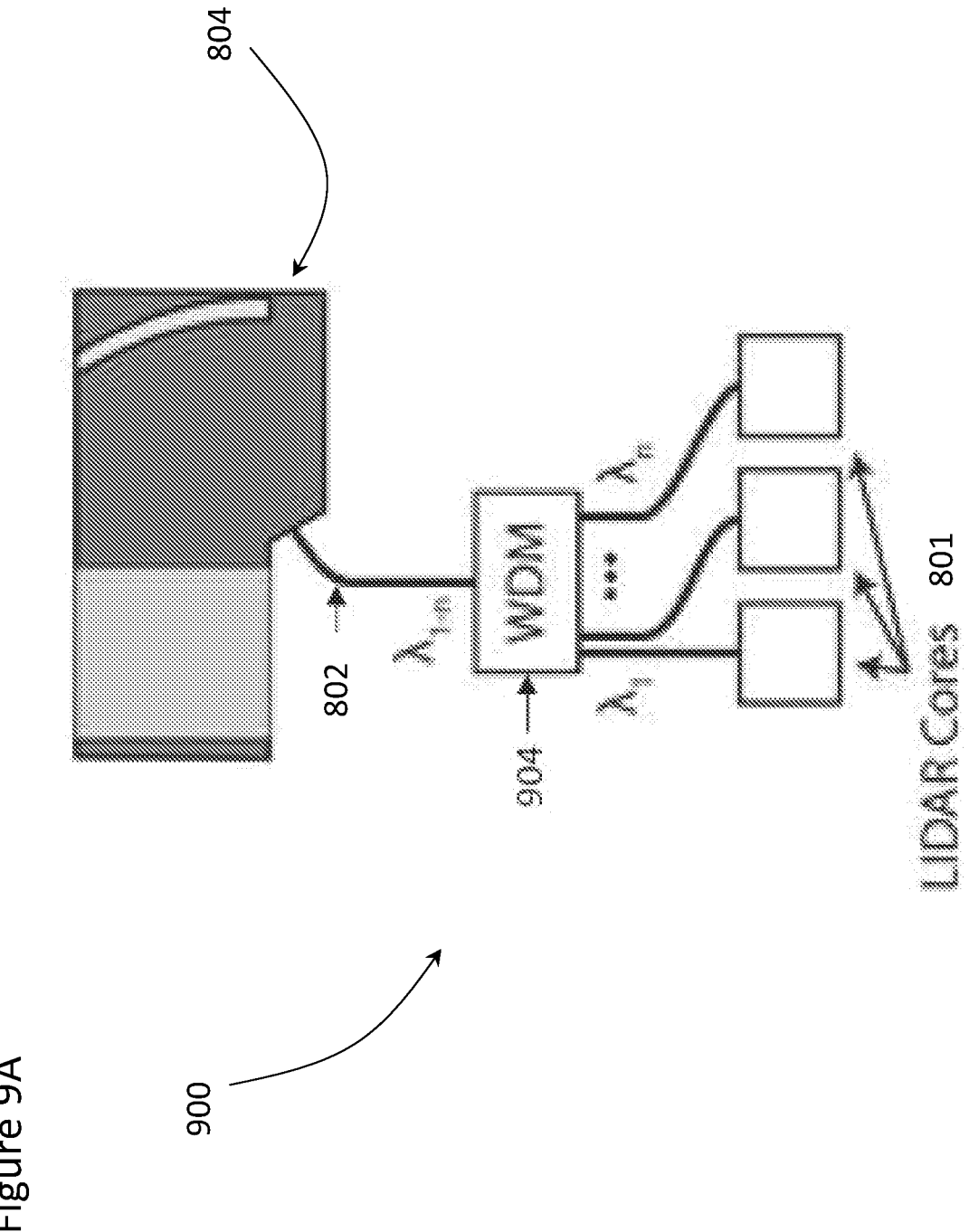
FIG. 9A is a top view of a photonic chip and waveguide components for beam steering in LIDAR sensing, in accordance with embodiments of the present disclosure.

FIGS. 9A-9D illustrate additional configurations for waveguide components for a LIDAR sensing device 900 that enable beam steering. In FIG. 9A, a wavelength division multiplexing element (WDM) 904 is connected to the launch waveguide 802. The WDM 904 connects one output, e.g. the launch waveguide 802, to two or more input waveguides that are each connected to a separate, corresponding LIDAR core 801. Each LIDAR core 801 may be associated with a different wavelength of light, and the WDM 904 routes light according to its wavelength, such that all wavelengths share the same launch waveguide 802, but each individual wavelength is routed to a separate input waveguide from a separate LIDAR core 801. This configuration allows simultaneous ranging at multiple output angles of a grating, e.g. grating 260, 312, 640 or 704, with each angle accessed by one of the separate LIDAR cores 801 at a separate wavelength.

Figure 9B:
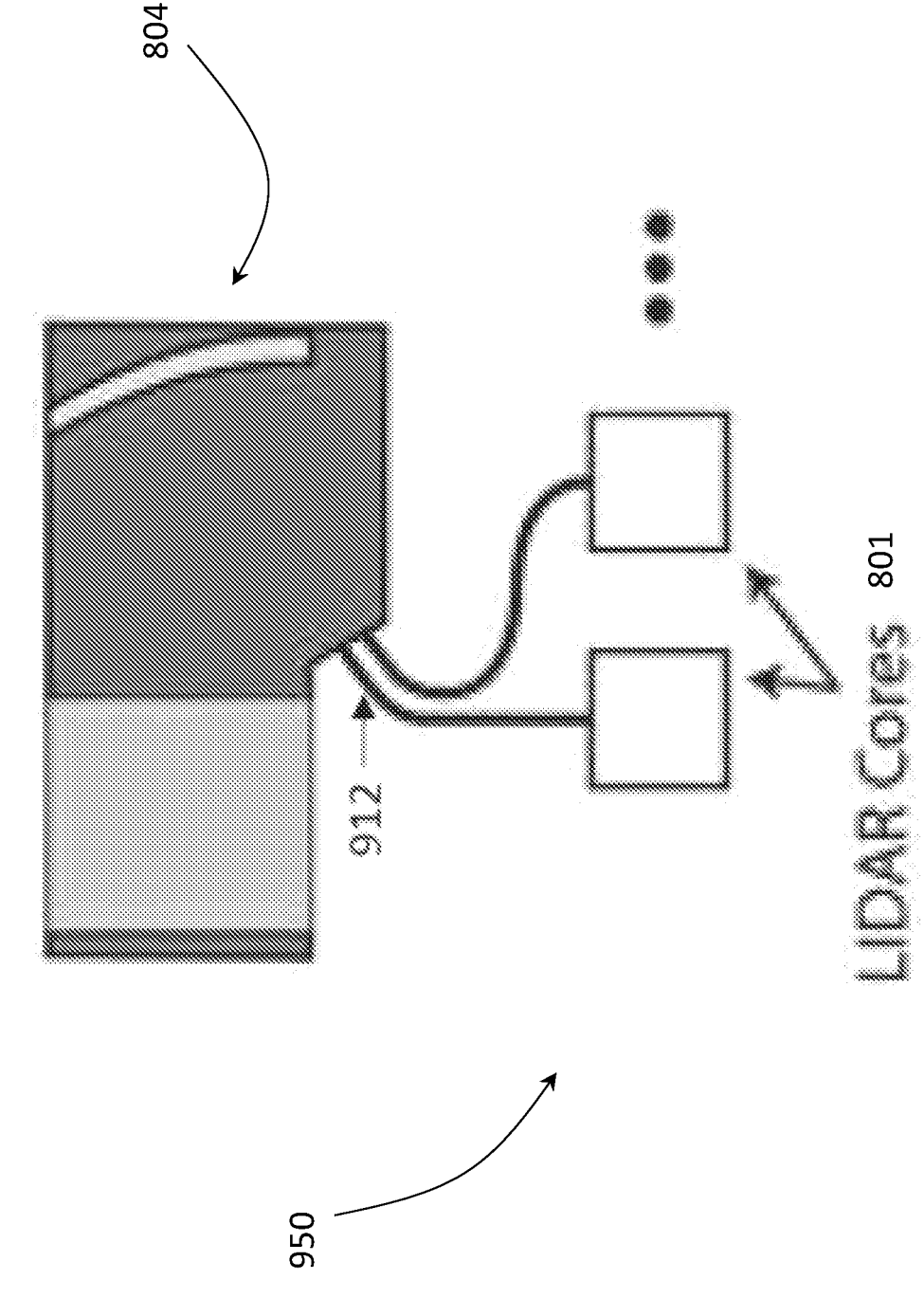
FIG. 9B is a top view of a photonic chip and waveguide components for beam steering in LIDAR sensing, in accordance with embodiments of the present disclosure.

With reference to FIG. 9B, a LIDAR sensing device 950 includes the mirror-based beamforming device 804, and a waveguide array 912, as in the waveguide array 302 in the embodiment of FIG. 3. Each of the waveguides in the waveguide array 912 may be attached to a separate LIDAR core 801.

Figure 9C:
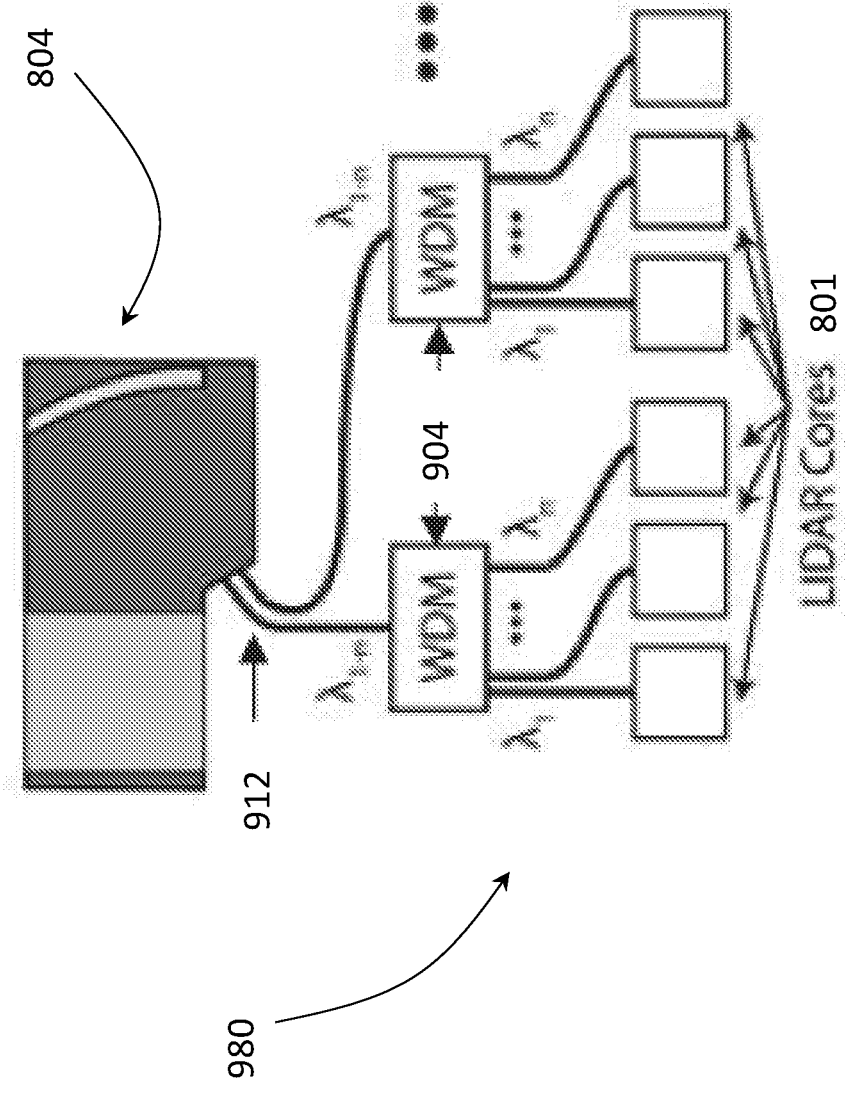
FIG. 9C is a top view of a photonic chip and waveguide components for beam steering in LIDAR sensing, in accordance with embodiments of the present disclosure.
Figure 10:
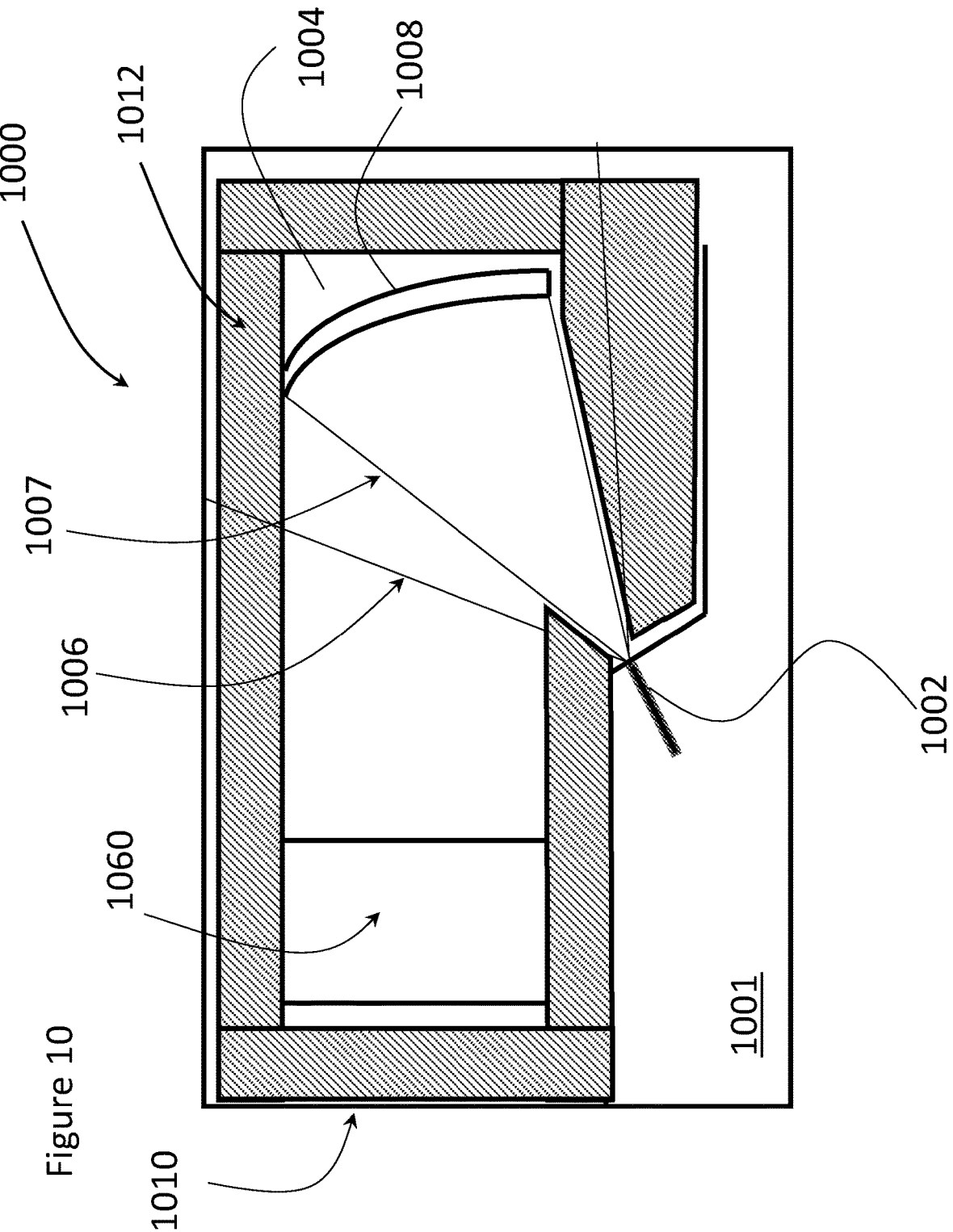
FIG. 10 is a top view of a an implementation of a mirror-based beamforming device with stray light attenuation structures, in accordance with embodiments of the present disclosure.

With reference to FIG. 9C, the underlying concepts of FIG. 9A and FIG. 9B are combined to yield, a LIDAR sensing device 980, which includes the mirror-based beamforming device 804, and a configuration in which each waveguide of the waveguide array 912, e.g. similar to the waveguide array 302 FIG. 9B, is attached to a different wavelength division multiplexing element (WDM) 904. Each WDM 904 receives individual different wavelength beams routed through separate input waveguides, each of which is attached to a separate LIDAR core 801.

Figure 9D:
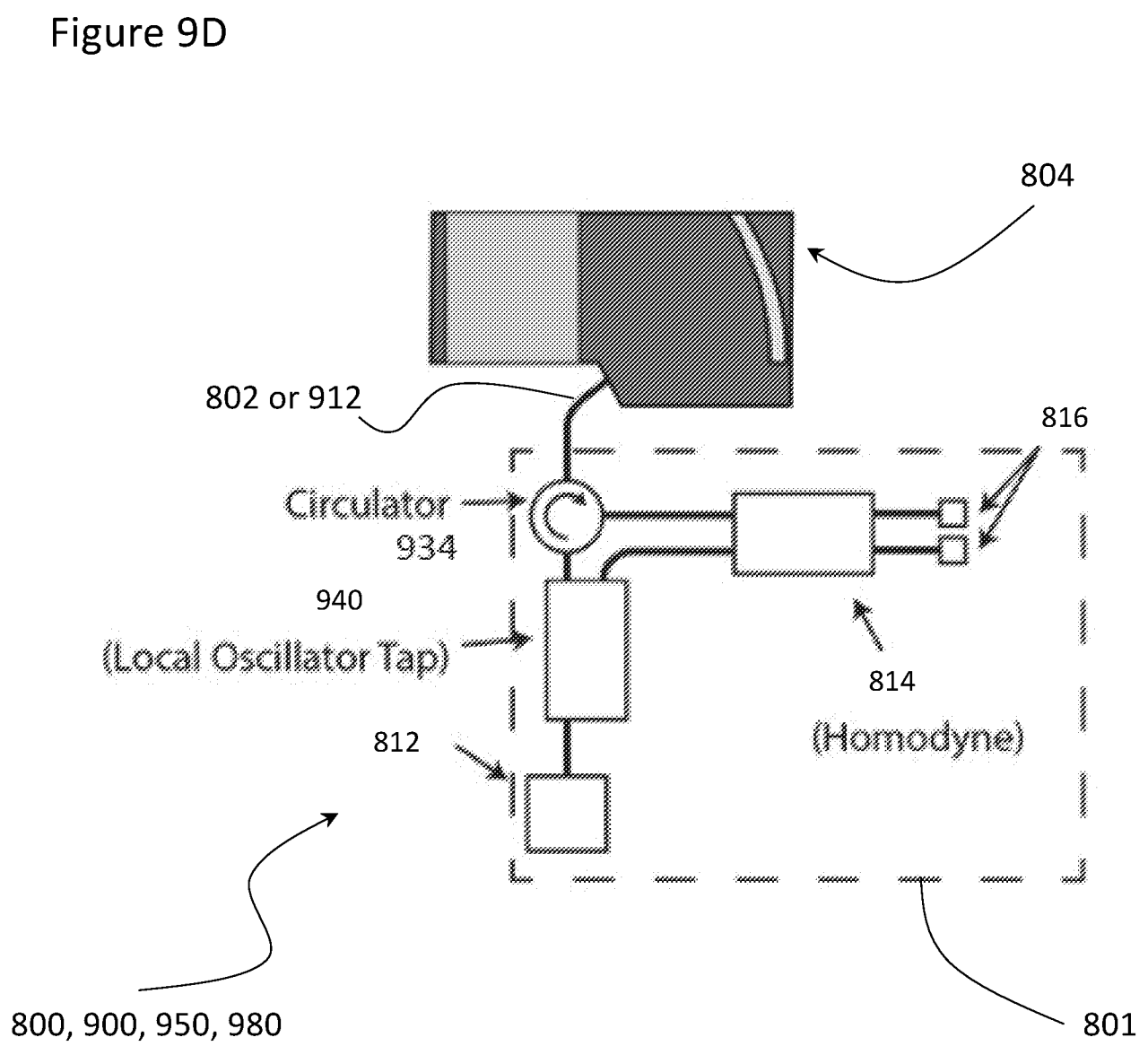

In any of the configurations shown in FIGS. 8A-8C, and 9A-9C, the beam director 810 of the LIDAR core 801 may comprise a circulator 934, such that: 1) output from the laser source 812 may travel to the launch waveguide 802 or 912; 2) light returning from the launch waveguide 802 or 912 may travel to the photodetector(s) 816, and 3) propagation in the reverse direction is prevented. FIG. 9D illustrates this embodiment, with a circulator 934 placed between the launch waveguide and the second splitter 814 of the LIDAR core 801 shown in FIGS. 8A-8C. The local oscillator is tapped from the laser output using an asymmetric 1×2 splitter 940, e.g. before the signal reaches the circulator 934.

In all of the aforementioned mirror-based beamforming structures, e.g. 200, 250 or 300, 400, 500 or 600 referred to as 1000, some of the light 1006 exiting the output waveguide 1002 will diverge so much that it exceeds the physical extent of the reflector 1008, continuing past its edge and not being reflected. Any portion of the beam not hitting the reflector 1008 falls outside the aperture of the optical system and is intended to be discarded. As with any optical system, special care must be taken to ensure that the unwanted light 1006 does not make its way into the optical path and out of the chip 1001 via the facet 1010 or the grating structure 1060 via various unintended reflections. Such a scenario could result in the creation of unwanted beam sidelobes and unwanted ghost images. Aperture beam stop or attenuation structures 1012 may be strategically disposed, e.g. beside, around, or behind the reflector 1008 or the grating structure 1060, in order to attenuate or reduce the unwanted rays of light 1006 from entering the optical system, but not attenuate or intersect the desired rays of light 1007. In some embodiments, the attenuation structures 1012 may be placed adjacent to but not intersecting a beam path of the expanding desired rays of light 1007 before it strikes the reflector 1008, e.g. on either side of the reflector 1008. In some embodiments, the attenuation structures 1012 may be formed by doping a section or a portion of the waveguide slab 1004, e.g. at the edges thereof. Light must pass through a sufficiently long enough length of the attenuation region in order for its intensity to attenuate to a minimally acceptable level, typically below −20 dB. By doping, e.g. with boron, phosphorus, or arsenic ion implants, a section of the waveguide slab 1004 to a concentration of greater than $1e19 \text{ cm}^{-3}$, a length of typically 250 µm is sufficient for this attenuation. Such doping levels also allow for minimal back-reflection at the boundary between doped and undoped waveguide material, e.g. silicon, because the refractive index change contributed by the doping is small. Light thus attenuated may eventually re-enter the optical system through stray reflections, but will be sufficiently attenuated by the structures 1012 to not have an adverse effect on the system performance.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A beam forming sensing device comprising:
   a first input port for launching a first output beam of light;
   an output for outputting the first output beam of light for reflection from a target;

a slab waveguide for confining the first output beam of light in a first dimension, while enabling the first output beam of light to diverge in a second perpendicular dimension; and
   a reflector coupled to the slab waveguide for redirecting and substantially collimating the first output beam of light at the output, the reflector comprising an elliptical reflector, which defines a segment of an ellipse comprising a first focus and a second focus, the first focus proximate the input port, the second focus located external to the beam forming sensing device and within an acceptable range of the target.

2. The beam forming sensing device according to claim 1, wherein the reflector comprises a plurality of reflecting surfaces arranged in sequence.

3. The beam forming sensing device according to claim 1, further comprising an output grating for directing the first output beam of light at a first angle to the slab waveguide.

4. The beam forming sensing device according to claim 3, further comprising a second input port for launching a second output beam of light comprising a different wavelength than the first output beam of light;
   wherein the output grating is configured to direct the second output beam of light at a second angle to the slab waveguide.

5. The beam forming sensing device according to claim 3, wherein the first input port is configured for launching a second output beam of light comprising a different wavelength than the first output beam of light;
   wherein the output grating is configured to direct the second output beam of light at a second angle to the slab waveguide.

6. The beam forming sensing device according to claim 1, further comprising a second input port for launching a second output beam of light directed at a different angle.

7. The beam forming sensing device according to claim 1, wherein the reflector comprises a metal coating on an edge of the slab waveguide.

8. The beam forming sensing device according to claim 1, wherein the reflector comprises a Bragg mirror on an edge of the slab waveguide.

9. The beam forming sensing device according to claim 1, wherein the reflector comprises a Bragg grating in the slab waveguide.

10. The beam forming sensing device according to claim 1, wherein the reflector comprises a junction between the slab waveguide, comprising a first material with a first index of refraction, and a cladding layer comprising a second material with a second index of refraction lower than the first index of refraction, whereby the first output beam of light is incident on the junction at glancing angles greater than a critical angle for total internal reflection.

11. The beam forming sensing device according to claim 1, further comprising attenuation structures disposed adjacent an optical path of the output beam of light for reducing stray light.

12. The beam forming sensing device according to claim 11, wherein the attenuation structures comprise doped sections of the slab waveguide.

13. The beam forming sensing device according to claim 1, further comprising a wavefront error corrector comprising a plurality of tunable phase-shifters adjacent to or inside the slab waveguide, each respective phase-shifter of the plurality of tunable phase-shifters configured for locally tuning an index of refraction of a portion of the slab waveguide, thereby shifting a phase of a section of the first output beam of light travelling adjacent to each respective phase-shifter for compensating for phase errors in the first output beam of light.

14. The beam forming sensing device according to claim 1, further comprising:

a splitter for dividing the first output beam of light into a plurality of sub-beams; and a plurality of phase shifters, a respective phase shifter for each sub-beam, each respective phase shifter for locally tuning a phase of one of the plurality of sub-beams and thereby control a wavefront of the plurality of sub-beam reflected off of the reflector;

wherein the reflector comprises a plurality reflector sections, a respective reflector section for each sub-beam.

15. The beam forming sensing device according to claim 1, further comprising a wavefront error correction layer positioned in a path of the first output beam of light, comprising a 3-D pattern for compensating for phase errors in the first output beam of light from propagation through the slab waveguide.

16. The beam forming sensing device according to claim 15, further comprising:

a cladding layer over the slab waveguide;

wherein the wavefront error correction layer is in the cladding layer.

17. The beam forming sensing device according to claim 15, further comprising:

a cladding layer over the slab waveguide;

an additional corrector layer over the cladding layer;

wherein the wavefront error correction layer is in this additional corrector layer.

18. A light detection and ranging (LIDAR) sensing device comprising:

a beam forming device comprising:

a first input port for launching a first output beam of light for reflection from a target, and for receiving a first input beam of light reflected from the target;

a slab waveguide configured for confining the first output beam of light in a first dimension, while enabling the first output beam of light to diverge in a second perpendicular dimension;

an elliptical reflector coupled to the slab waveguide configured for redirecting and collimating the first output beam of light for output, and configured for redirecting and focusing the first input beam of light on the first input port;

wherein the elliptical reflector defines a segment of an ellipse comprising a first focus and a second focus;

wherein the first focus is proximate the input port; and wherein the second focus is located external to the beam forming device and within an acceptable range of the target; and a first LIDAR core comprising:

a first laser for generating the first output beam of light;

a first photodetector for detecting the first input beam of light; and a first beam director configured for directing the first output beam of light to the first input port, and for directing the first input beam of light to the first photodetector.

19. The device according to claim 18, wherein the beam director is also configured to direct a portion of the first output beam of light to the photodetector for comparison with the first input beam of light.

20. The device according to claim 18, further comprising a second LIDAR core comprising:

a second laser for generating a second output beam of light with a wavelength different than the first output beam of light;

a second photodetector for detecting a second input beam of light;

a second beam director configured for directing the second output beam of light to the first input port, and for directing the second input beam of light to the second photodetector; and a first wavelength division multiplexer configured for combining the first output beam of light and the second output beam of light for launching from the first input port.

21. The device according to claim 18, wherein the beam forming device comprises a second input port; and further comprising a second LIDAR core comprising:

a second laser for generating a second output beam of light with a wavelength different than the first output beam of light;

a second photodetector for detecting a second input beam of light;

a second beam director configured for directing the second output beam of light to the second input port, and for directing the second input beam of light to the second photodetector.

* * * * *